United States Patent [19]
Wittenstein et al.

[11] Patent Number: 6,026,180
[45] Date of Patent: Feb. 15, 2000

[54] METHOD AND APPARATUS FOR COMPRESSION AND DECOMPRESSION OF COLOR DATA

[75] Inventors: Andreas Wittenstein, Lagunitas; Loren Carpenter, Novado; Leo Hourvitz, San Francisco, all of Calif.

[73] Assignee: Pixar, Richmond, Calif.

[21] Appl. No.: 08/937,642

[22] Filed: Sep. 24, 1997

Related U.S. Application Data

[62] Division of application No. 08/484,345, Jun. 7, 1995, Pat. No. 5,734,744.

[51] Int. Cl.[7] .................................................. G06K 9/36
[52] U.S. Cl. ............................................................. 382/166
[58] Field of Search .................................... 382/166, 236, 382/239; 348/412, 413, 415, 416, 420, 523; 358/430, 539

[56] References Cited

U.S. PATENT DOCUMENTS

| | | | |
|---|---|---|---|
| 5,049,986 | 9/1991 | Aono et al. | 358/523 |
| 5,467,413 | 11/1995 | Barrett | 382/236 |
| 5,506,624 | 4/1996 | Moreton | 348/420 |
| 5,734,744 | 3/1998 | Wittenstein et al. | 382/166 |
| 5,760,836 | 6/1998 | Greenfield et al. | 348/419 |

*Primary Examiner*—Jose L. Couso
*Attorney, Agent, or Firm*—Hecker & Harriman

[57] ABSTRACT

The present invention is a method and apparatus for compressing and decompressing data. In particular, the present invention provides a method for compressing color video data for storage on a CD-ROM for later playback on a computer system. The present invention uses an asymmetrical compression-decompression scheme that provides color compression, temporal compression, and spatial compression. In the preferred embodiment of the invention, the color compression is accomplished in three stages. In the first stage, the colors are sampled from the source data. This generates a histogram that contains the colors of the source material. Next, these colors are quantized into the target colors. In the third step of the color compression, the actual colors on the film are mapped to the quantized colors. The temporal compression step specifies a target display rate. Only those pixels that have changed significantly from frame to frame are updated. A bit mask is generated for each frame and is used to target those pixels that will be updated for each frame. The spatial compression step is used to further reduce storage requirements by dividing data into pixel "tiles." The CD-ROM stores an index into the table so that when data is required only the index need be provided, not the tile.

93 Claims, 14 Drawing Sheets

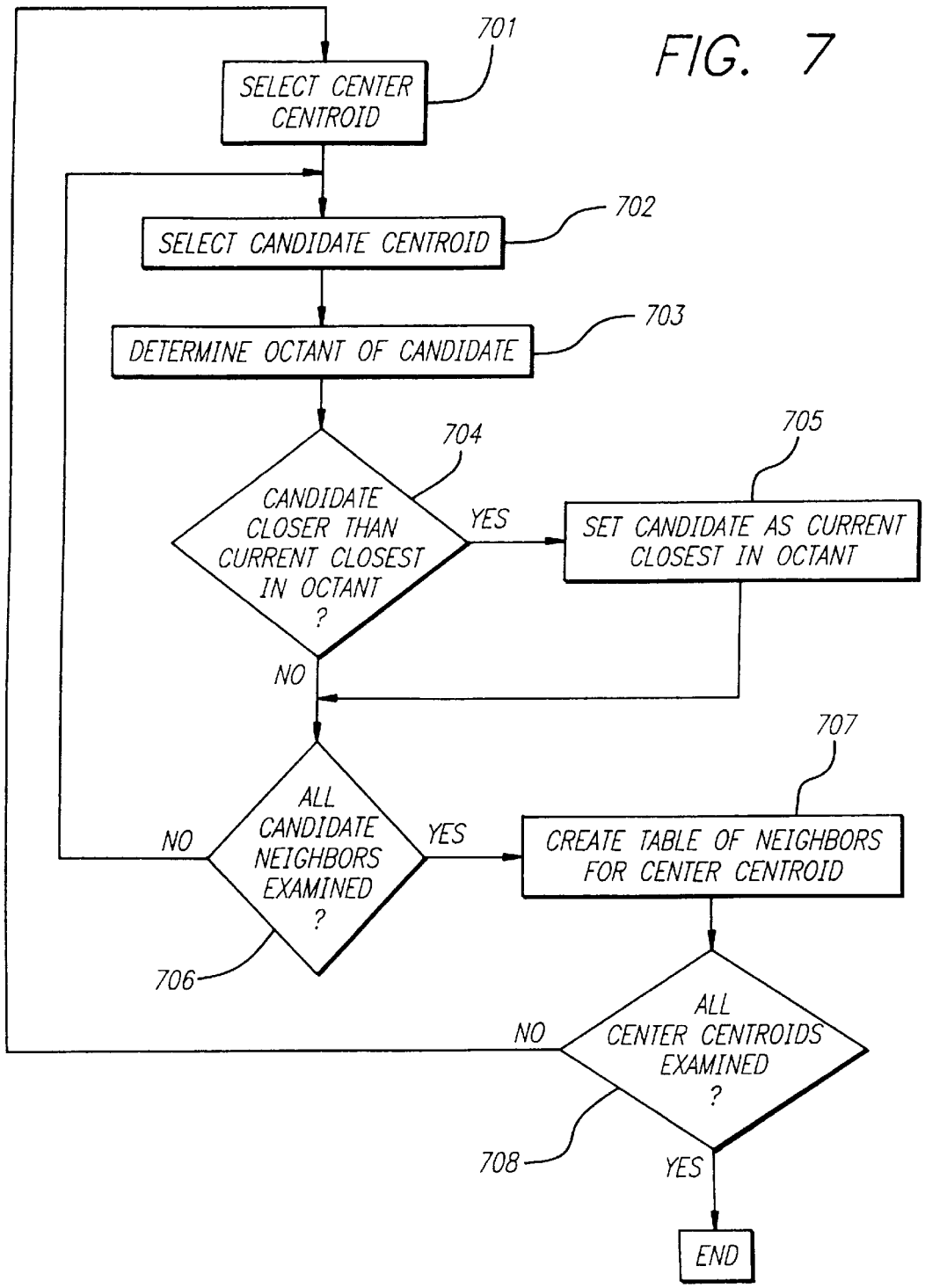

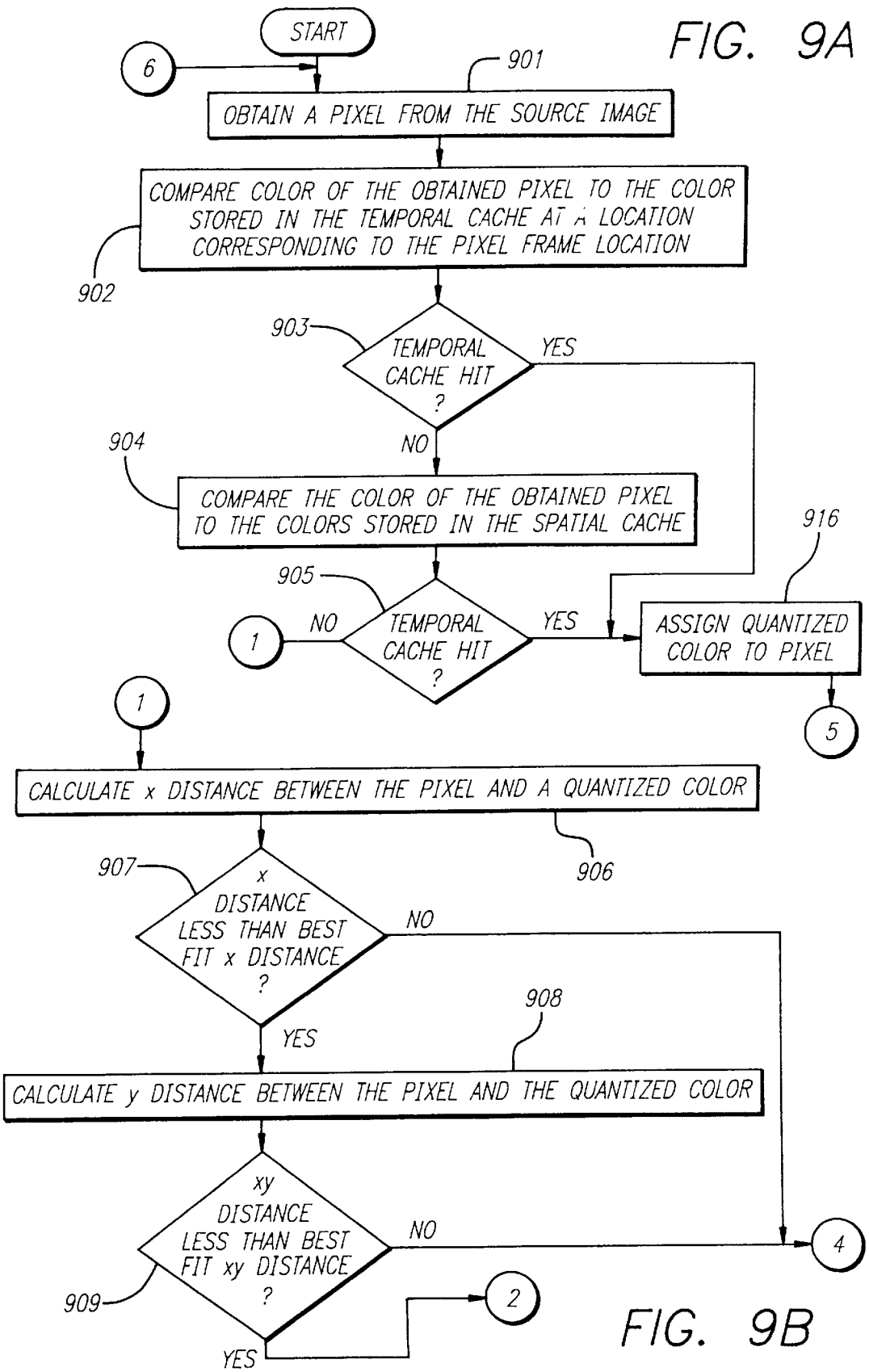

METHOD AND APPARATUS FOR COMPRESSION AND DECOMPRESSION OF COLOR DATA

This is a divisional of application Ser. No. 08/484,345, filed Jun. 7, 1995 now U.S. Pat. No. 5,734,744.

BACKGROUND OF THE INVENTION

1. Field of the Invention

This invention relates to the field of compression and decompression of data.

2. Background Art

Computers are often used to process, play back, and display video data. This video data may come from sources such as storage devices, on-line services, VCRs, cable systems, broadcast television tuners, etc. Video data is memory intensive, that is, video data requires large amounts of memory for storage and use by a computer system. CD-ROMs provide one solution to the problem of storing large amounts of data. However, even the storage capabilities of a CD-ROM can be exceeded when storing motion picture length video data.

To reduce the transmission bandwidth and memory requirements when working with video data, various compression schemes have been developed so that less storage space is needed to store video information and a smaller bandwidth is needed to transmit it. Prior art video compression schemes include Motion JPEG, MPEG-1, MPEG-2, Indeo, Quicktime, True Motion-S, CinePak, etc.

A disadvantage of existing prior art compression schemes is their inability to provide adequate quality of playback in terms of format (spatial resolution), frame rate (temporal resolution) and color fidelity. In addition, the existing prior art schemes do not adequately compensate for the low data output rate of CD-ROMs. CD-ROMs suffer from a disadvantage of having a low data output rate compared to that needed for realistic video playback.

With respect to spatial resolution, many prior art schemes do not provide a "full screen" of video output. Here, full screen is defined as 640 by 480 color pixels. Many prior art compression schemes provide a small "box" that displays video data. Such small displays are difficult to view, and do not provide adequate playback of video data. Regarding temporal resolution, many of the prior art schemes provide "choppy" playback of video data, with jerky motion, and pauses in playback while new frame data is being generated.

Many source images include high resolution color information. For example, the source image may have a color resolution of 15, 24, or 32 bits per pixel. Many computer systems are only capable of providing 8 bit per pixel color output. This requires that the large number of colors of the source image be mapped to a smaller number of colors that can be displayed by the computer system. This step involves the use of a color look-up table (LUT). Prior art compression schemes typically rely on the host computer system to provide a color lookup table. These color lookup tables are not optimized for the particular source image, so unsatisfactory color display results.

Another disadvantage of prior art compression schemes is that they are "symmetrical". These schemes attempt to compress the data in the same time it takes to display the data. Typically, prior art compression schemes compress the data in a single pass, in real time or as close to it as possible. This limits the performance of prior art compression schemes.

SUMMARY OF THE INVENTION

The present invention is a method and apparatus for compressing and decompressing data. In particular, the present invention provides a method for compressing color video data for storage on a CD-ROM for later playback on a computer system. The present invention uses an asymmetrical compression-decompression scheme where the compression takes longer than the decompression. The compression of the color video data is optimized so that playback of the compressed video data on a computer system more closely approximates the original source image.

The present invention converts 24-bit true color data to 8-bit categorical color data using color compression, temporal compression, and spatial compression.

In the preferred embodiment of the invention, the color compression is accomplished in three stages. In the first stage, the colors are sampled from the source data. This generates a histogram that contains the colors of the source material. Next, these colors are quantized into the target colors. In the preferred embodiment of the present invention, the quantizing step yields two hundred and fifty-six colors. In the third step of the color compression, the actual colors on the film are mapped to the quantized colors.

The temporal compression step is accomplished by specifying a target display rate. In the preferred embodiment of the invention, the target display rate is fifteen frames per second for a 640×480, 8-bit color display. This target display rate is limited by the display update rate and the reading rate from the CD-ROM. To limit the number of pixels that need to be updated for each frame, only those pixels that have changed significantly from frame to frame are updated. The temporal compression step is used to determine which pixels change significantly from frame to frame, and therefore, need to be updated. A bit mask is generated for each frame and is used to target those pixels that will be updated for each frame.

The spatial compression step is used to further reduce storage requirements by dividing data into 4×4 pixel "tiles." The CD-ROM stores an index into the table so that when data is required only the index need be provided, not the tile. This allows the tile to be stored once but displayed many times, further reducing storage requirements.

Decompression is accomplished by providing the optimized color table to the display system and mapping the colors in the color table to the best colors available on the display. This color mapping is done once during loading where delays in displaying the first frame of a sequence of frames are acceptable. A tile table is also loaded into the main memory of the display computer system, and the indexes to the tile look-up table are retrieved from the CD-ROM for display.

BRIEF DESCRIPTION OF THE DRAWINGS

FIG. 7 is a process flow diagram illustrating the centroid neighbor calculation of the present invention.

FIGS. 9A, 9B, 9C, and 9D are a process flow diagram of the pixel quantizing step of the present invention.

DETAILED DESCRIPTION OF THE INVENTION

A method and apparatus for compression and decompression of data is described. In the following description numerous, specific details, such as number of colors, bits per pixel, data read rate, etc., are set forth in order to provide a more thorough understanding of the present invention. It will be apparent, however, to one skilled in the art, that the present invention may be practiced without these specific details, In other instances, well known features have not been described in detail so as not to unnecessarily obscure the present invention.

In the preferred embodiment of the present invention, source image material consists of computer animated movies. These movies may be based on three-dimensional renderings and, for purposes of example, consist of 24-bit color with 8 bits for red, green, and blue color channels respectively. Although the preferred embodiment of the present invention utilizes computer-animated movies, live action movies or any other source can be used without departing from the spirit and scope of the present invention.

The present invention can be used for traditional movies (i.e., sequential frame access) or interactive movies (random frame access). The output computer system of the present invention is assumed to be a computer system that supports a display format of 640×480, 8-bit indexed color pixels at a display rate of approximately 15 frames per second. The data is compressed so that a data rate that can be read off a double-speed CD-ROM drive in real time is accomplished. This system is given by way of example only and other data rates, storage devices, color resolutions, etc., can all be used with the present invention.

The present invention implements an asynchronous, multiple pass compression scheme offering parametric control and manual intervention during each phase of operation. This permits a degree of artistic and technical control designed to optimize and maximize the quality of the compressed movie. For comparable image quality, the invention reduces computer-intensive, bandwidth-intensive, and storage-intensive aspects of prior art video decompression schemes at the expense of using more resources during the compression phase.

COMPUTER SYSTEM

Figure 1:
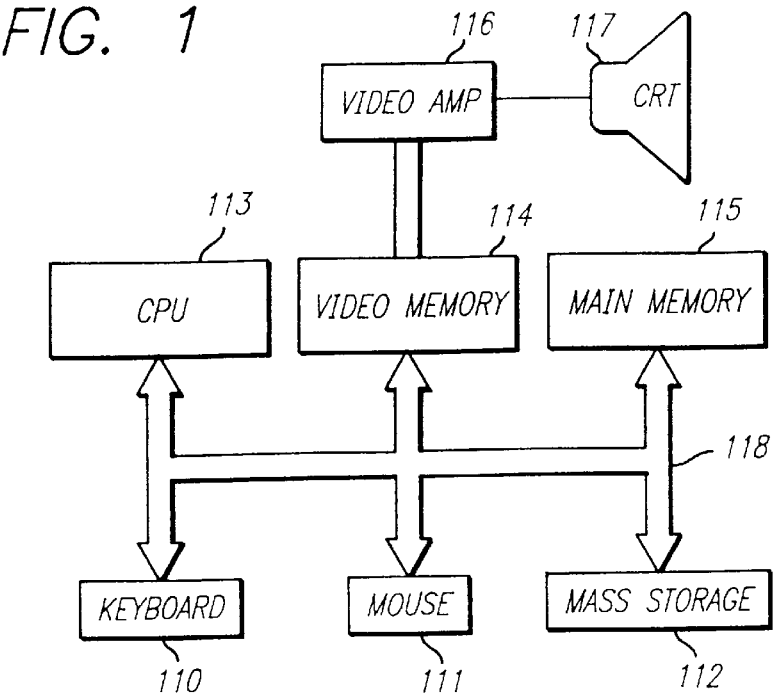
FIG. 1 is a diagram of a computer system that may be used with the present invention.

The present invention may be implemented on any conventional or general purpose computer system. An example of one embodiment of a computer system for implementing this invention is illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. In the preferred embodiment of the present invention, for decompression, the mass storage is a double speed CD-ROM drive. For compression, the mass storage should be writable, and magnetic disks are used in the preferred embodiment. The mass storage may be shared on a network, or it may be dedicated mass storage. Bus 118 may contain, for example, 32 address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In the preferred embodiment of this invention, the CPU 113 is a 32-bit microprocessor manufactured by Motorola, such as the 68030, 68040, or PowerPC. However, any other suitable microprocessor or microcomputer, such as the 80386, 80486, or Pentium microprocessors manufactured by Intel Corporation of Santa Clara, Calif., may be utilized.

Main memory 115 is comprised of dynamic random access memory (DRAM) and in the preferred embodiment of this invention, comprises 4 megabytes of memory for decompression and 16 megabytes of memory for color compression. More or less memory may be used without departing from the scope of this invention. Video memory 114 is a dual-ported video random access memory, and in this invention consists, for example, of 300 kilobytes of memory for decompression and 1.2 megabytes of memory for compression. However, more or less video memory may be provided as well.

One port of video memory 114 is coupled via video multiplexing shifter circuitry (not shown) to video amplifier 116. The video amplifier 116 is used to drive the cathode ray tube (CRT) raster monitor 117. Video multiplexing shifter circuitry and video amplifier 116 are well known in the art and may be implemented by any suitable means. This circuitry converts pixel data stored in video memory 114 to a raster signal suitable for use by monitor 117. Monitor 117 is a type of monitor suitable for displaying graphic images, and in the preferred embodiment of this invention, has a resolution of at least 640×480. Other resolution monitors may be utilized in this invention.

The computer system described above is for purposes of example only. The present invention may be implemented in any type of computer system or programming or processing environment.

COMPRESSION

The compressor of the present invention compresses a sequence of full-color images (stored, for example, as 24-bit RGB PICT or TIFF files) into a stream of tile store codes, skip codes, background codes, and tile display codes. A skip code specifies where on the display the next tile should appear if it is not in sequential scan line order. A background code specifies how many tiles to copy from the corresponding position in a background image. A tile display code specifies which (4×4 pixel) tile of indexed colors from the tile table to display at the current tile position. The tile display code is converted to an index into a table of indexed color tiles. If the movie is an interactive movie, a fixed tile table is stored at the beginning of the entire movie. For a sequential movie, the tile table can be changed and is stored dynamically, with a batch of tile store codes at the beginning of each frame. The tile store codes specifies which entry in the tile table to replace with what tile of the next color pixels. The color indices are indices into a color table which, like the tile table, is either a fixed color table for a random access movie, or a dynamically updated color table for a sequential access movie.

Figure 2:
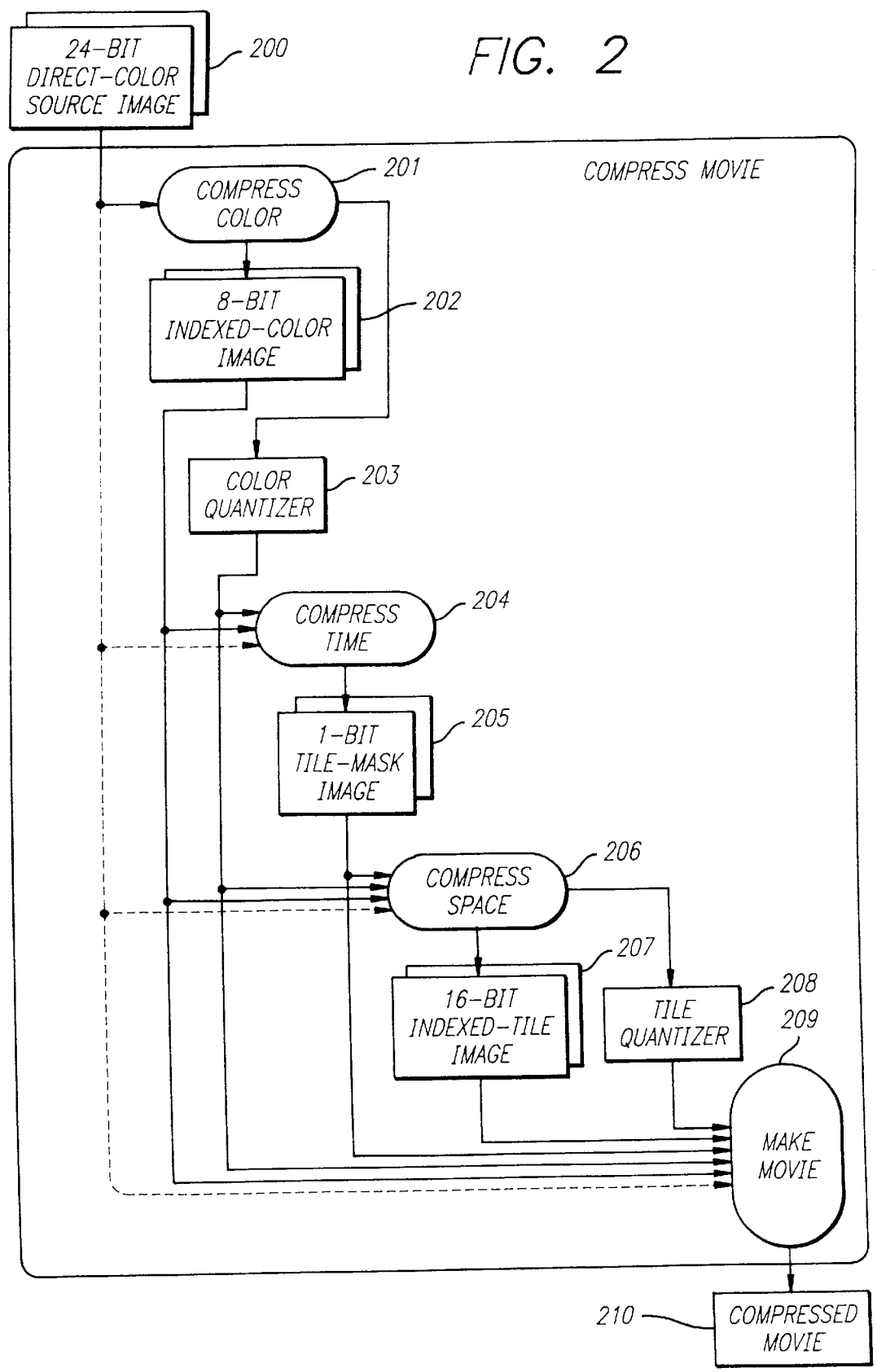
FIG. 2 is an information flow diagram of the operation of the present invention.

FIG. 2 is a flow diagram illustrating the compression scheme of the present invention. The present invention begins, in the preferred embodiment, with a sequence of 24-bit direct color source images 200. The present invention then executes a color compression step 201, a time compression step 204 and a spatial compression step 206 to lead to a compressed movie 210.

At step 201, the color compression step, the original colors of the source image are quantized using a color quantizer 203 to yield 8-bit indexed color images 202. In this step, the true colors of the source movie are mapped to some number (e.g., 256) of color table values and the pixels of each frame are mapped to a quantized color of the color table to create an indexed color image.

Temporal compression 204 is applied to these indexed color images to generate one-bit tile mask images 205. Temporal compression is used to reduce the number of bits that need to be updated in a refresh cycle. Ideally, only those pixels that are changed are updated. By identifying only those pixels that need to be updated from frame to frame, the effective speed of updating is increased.

Spatial compression 206 uses tile quantization 208 to generate 16-bit indexed tile images 207. This reduces the display data by defining tiles in a look-up table and storing only the indexes to the tiles in the data stream. In this manner, a single tile that may be displayed many times is stored only once, and a smaller index to that tile can be stored many times in the data stream. The indexed color images 202, tile mask images 205, and indexed tile images 207 are combined at step 209 to generate a compressed movie 210.

COLOR COMPRESSION

Figure 3:
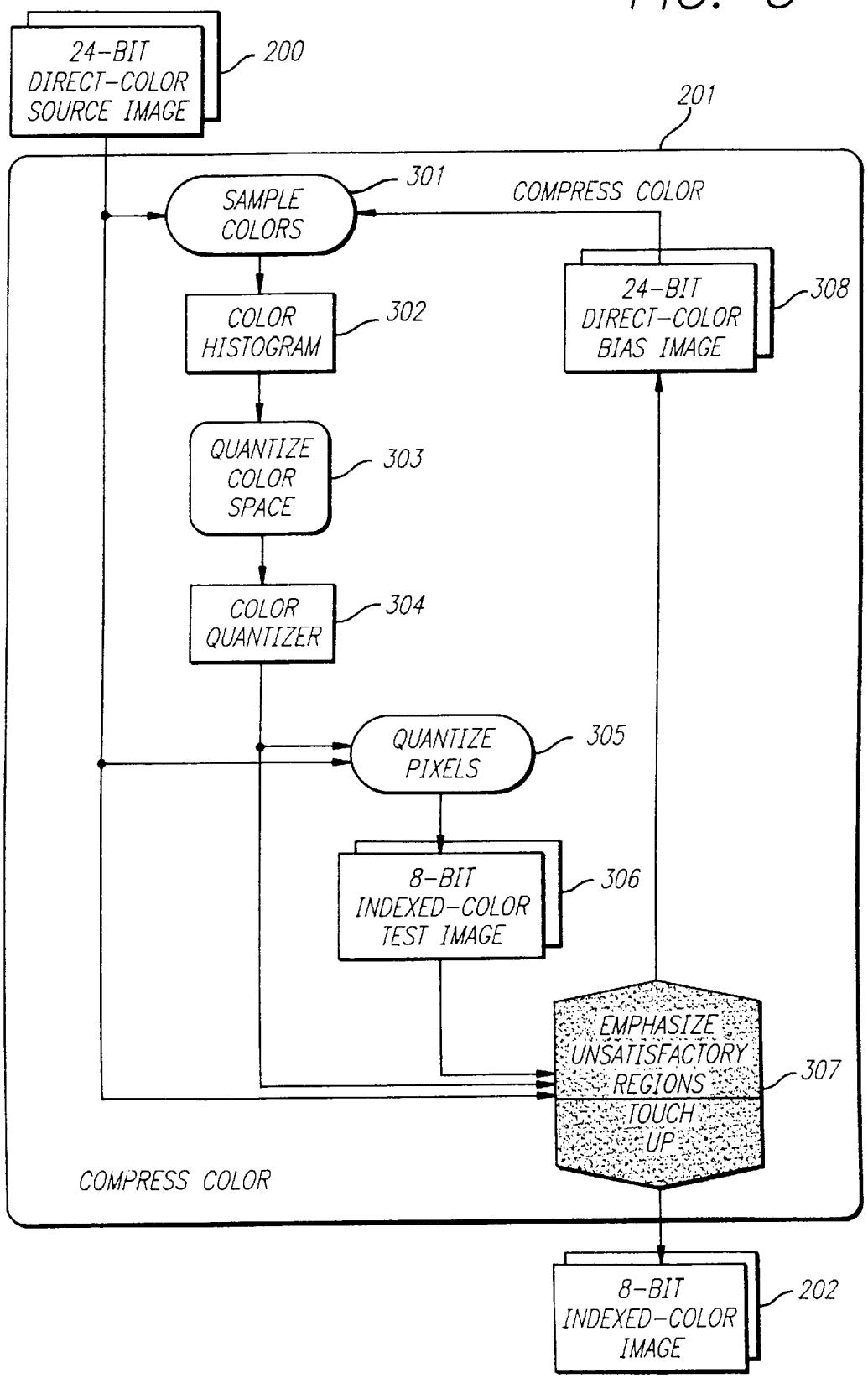
FIG. 3 is an information flow diagram of the operation of the color compression step of FIG. 2.

FIG. 3 is an information flow diagram illustrating the color compression 201 of the present invention. The color compression is accomplished by sampling the colors 301, quantizing the color space 303 and then quantizing the pixels 305 (i.e. assigning quantized colors to film pixels). The 24-bit source images 200 are sampled at the sample color step 301 to create a color histogram 302. The histogram is subjected to a quantization step at quantize color space 303 to yield a color quantizer 304. The color quantizer provides an optimum mapping of the source colors to a desired number (i.e. 256) of quantized colors. At quantize pixels step 305, each pixel is assigned a color from the color quantized table to generate an 8-bit indexed color test image 306. This test image can be used as the indexed color images 202 or optional step 307 may be applied. At optional step 307 unsatisfactory regions can be reviewed and touched up to create 24-bit direct color bias images 308 which are returned to the color compression process at step 301.

The sample color step 301, quantize color step 303, and quantize pixels step 305 are described in detail below with respect to FIGS. 4, 5, and 6 respectively.

Sample Colors 301

Figure 4:
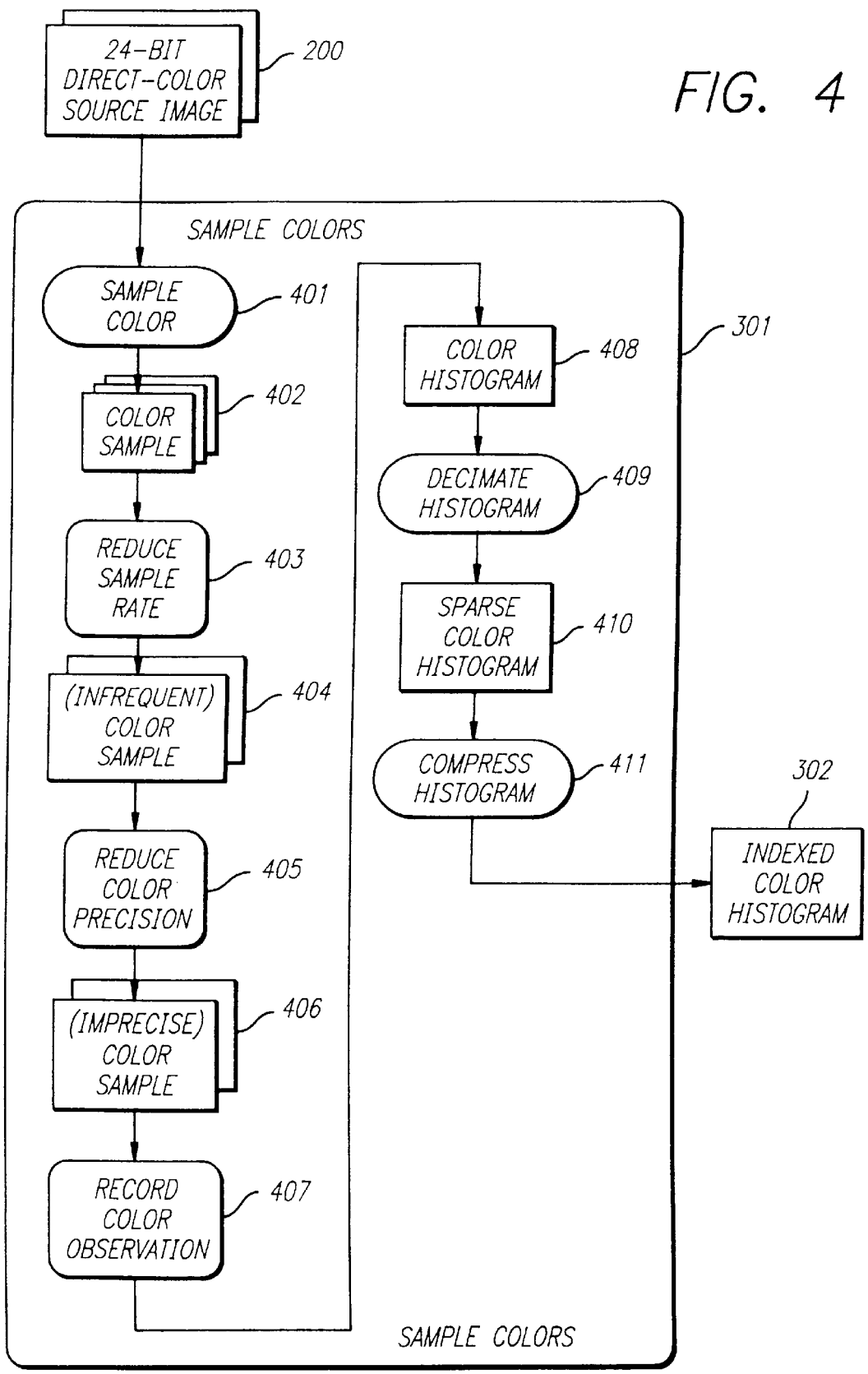
FIG. 4 is an information flow diagram of the operation of the color sampling step of FIG. 3.
Figure 5:
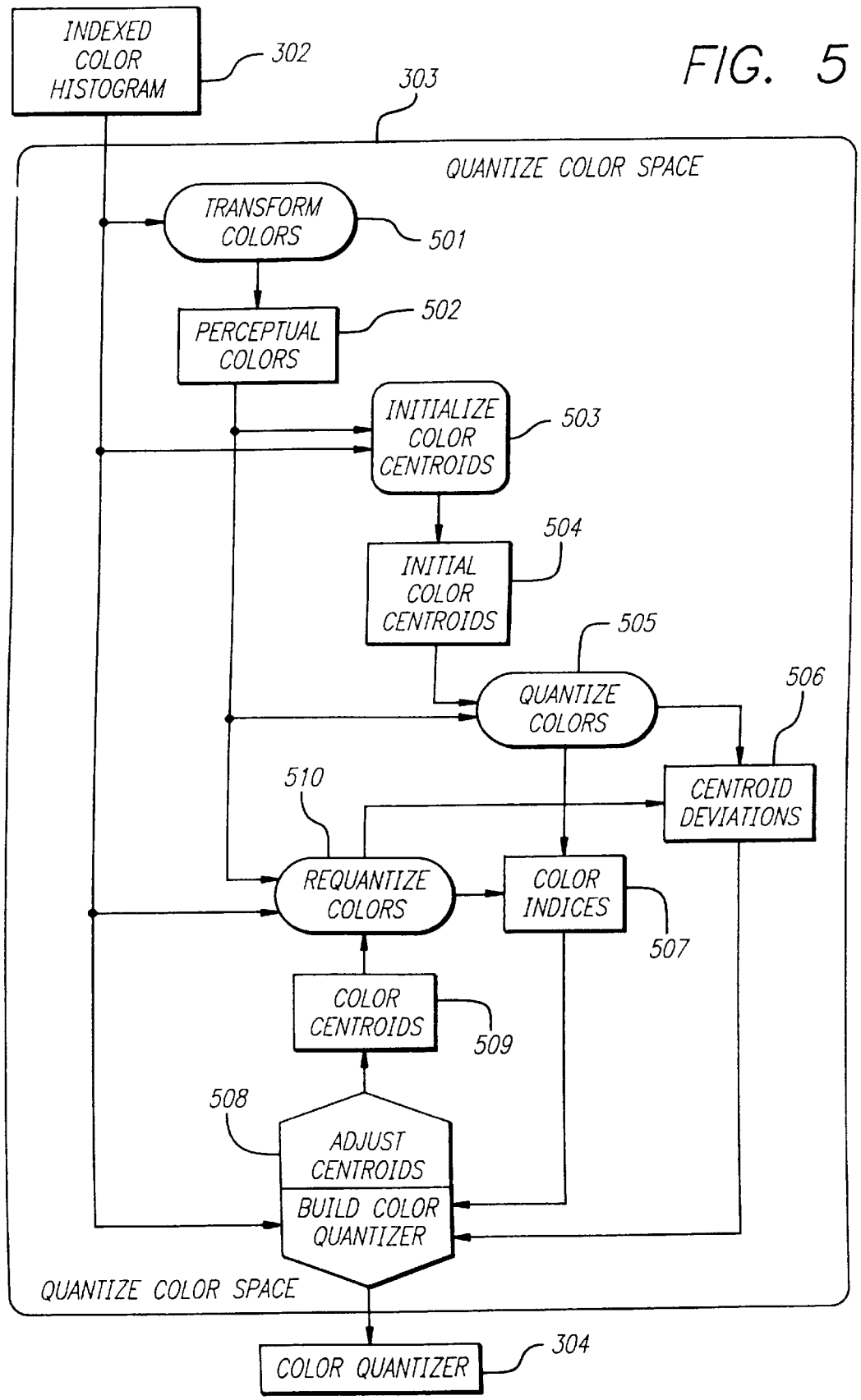
FIG. 5 is an information flow diagram of the operation of the color quantizing step of FIG. 3.

FIG. 4 is a flow diagram illustrating the method of color sampling in the present invention. Essentially, the color sampling consists of generating a histogram of the colors of the film. A histogram is a graph that represents the population of a plurality of characteristics of a sample set. In this case, the characteristics are different colors. A histogram is considered to be a series of "bins" where each bin represents one of the possible colors. For 24 bit color, there are $2^{24}$ equals 16,777,216 different colors. Therefore, a histogram for a 24-bit color sample would have 16,777,216 bins. Each bin contains a number representing the number of samples (i.e., pixels) in the source material that have the associated color.

In the present invention, the histogram can be generated in one of two ways, a full histogram or a reduced histogram. For a full histogram, every sample of the source data is counted and placed in its appropriate bin. A full histogram requires a large amount of memory for storage. If there are 32 bits (4 bytes) count available for storage of each possible color, four ($2^{24}$) equals 64 megabytes of memory required for the full histogram. A 4-byte count for each possible color value is sufficient to represent 4,294,967,295 pixels (samples) of each color value. Adding another byte per bin would require approximately 80 megabytes of memory for the histogram table.

The memory required for the histogram may be reduced (a reduced histogram) by reducing the sampling frequency. The target storage space (i.e., 16 megabytes) is compared to the total number of samples in the source film. This ratio is used to calculate a sampling frequency rate that will permit use of the reduced memory histogram without overflowing. The factor of reduction of the sampling rate from full sampling rate to new sampling rate is used to determine how many pixels will be grouped together to effectuate the lower sampling rate. For example, if the sampling rate is reduced by 4, the pixels are sampled in groups of 4, and in each sample one of the four pixels is pseudo randomly chosen as the representative sample of that group of 4 pixels. Code illustrating the operation of this stage of the invention is illustrated in Appendix 1.

After the histogram is generated, it may be optionally decimated. To decimate the histogram, the histogram is examined to determine the number of bins of the 16 million plus bins that are in fact populated with observations. In a typical film, many of the bins will likely be populated.

Next, a target number for a fraction of the populated bins is selected. For example, consider the case where there are one million populated bins in the histogram, and it is desired to reduce that number to 100,000. The algorithm of the present invention, which is illustrated in the code of Appendix 2, first brackets the decimation fraction to between zero and one, and guesses it to be the target number of colors divided by the number of populated bins. In this case, that fraction would be one tenth. It then reduces this range and revises its guesses by binary search until it finds the decimation fraction that yields the target number of bins, as follows: If the decimated bin count would be less than the target bin count, then the lower limit is set to just above the guessed fraction; otherwise the upper limit is set to just below the guessed fraction. In either case, the next guess is set to the center of the new range. This test is repeated until the decimated bin count reaches the target bin count, at which point the histogram is actually decimated at the guessed decimation fraction. The histogram is decimated by multiplying the population of each populated bin by the decimation fraction, resolving fractional populations by adding a pseudorandom fraction less than one, and taking the integer part. This decimated histogram is then used in subsequent processing steps.

FIG. 4 illustrates a detailed information flow of the sample color step 301 of FIG. 3. At sample color step 401, a color of the 24-bit source images 200 is sampled to create a color sample 402. If desired, each color in the source image can be sampled to create a full histogram of the entire source image. Alternatively, a reduced sampling rate 403 as described above can be used to generate an infrequent color sample 404. Another time and memory saving step is a reduced precision step 405 which yields (imprecise) color sample 406. At step 407, the color observation is recorded i.e., the bin for that color is incremented to create a color histogram 408. This color histogram can be used as the indexed color histogram 302. Alternatively, the histogram may be decimated at step 409 to create a sparse color histogram 410. If desired, the full histogram or the sparse color histogram can be compressed at step 411 to yield an indexed color histogram 302.

Quantizing The Color Space 303

After the histogram has been generated and modified if desired, the next step is to quantize the color space. The purpose of this step is to determine the 256 colors that are most optimal for representing the hundreds of thousands or millions of colors in the source image file histogram. An information flow diagram for accomplishing the quantization of the colors is illustrated in FIG. 5.

At step 501, the data from the indexed color histogram 302 is subjected to a color transformation step to yield perceptual colors 502. At step 503, a desired number of perceptual colors 502 are initialized as color centroids, yielding initial color centroids 504. At step 505, the histographed colors are quantized to the initial color centroids to yield centroid deviations 506 and color indices 507. This step involves assigning each color sample to the nearest centroid and accumulating the deviations of all samples assigned to a centroid. The centroid deviations 506 are used at step 508 to adjust the color centroids to new values 509. In this step, the deviations, modified with pseudorandom noise, are added to the previous centroids. The color samples are then requantized to these new color centroids to generate new centroid deviations 506 and color indices 507. This loop is repeated with a decreasing amount of pseudorandom noise until the noise level and the centroid deviations are zero or within a predetermined "fit". (The iteration comprising steps 508 and 510 is derived from the Lloyd algorithm, extended to multiple dimensions for the perceptual color space, and modified with simulated annealing, or stochastic relaxation, to find a global optimum. The requantize color step is illustrated in the code of Appendix 3A). At that point the color quantizer is built at step 508 and results in color quantizer 304.

Figure 6:
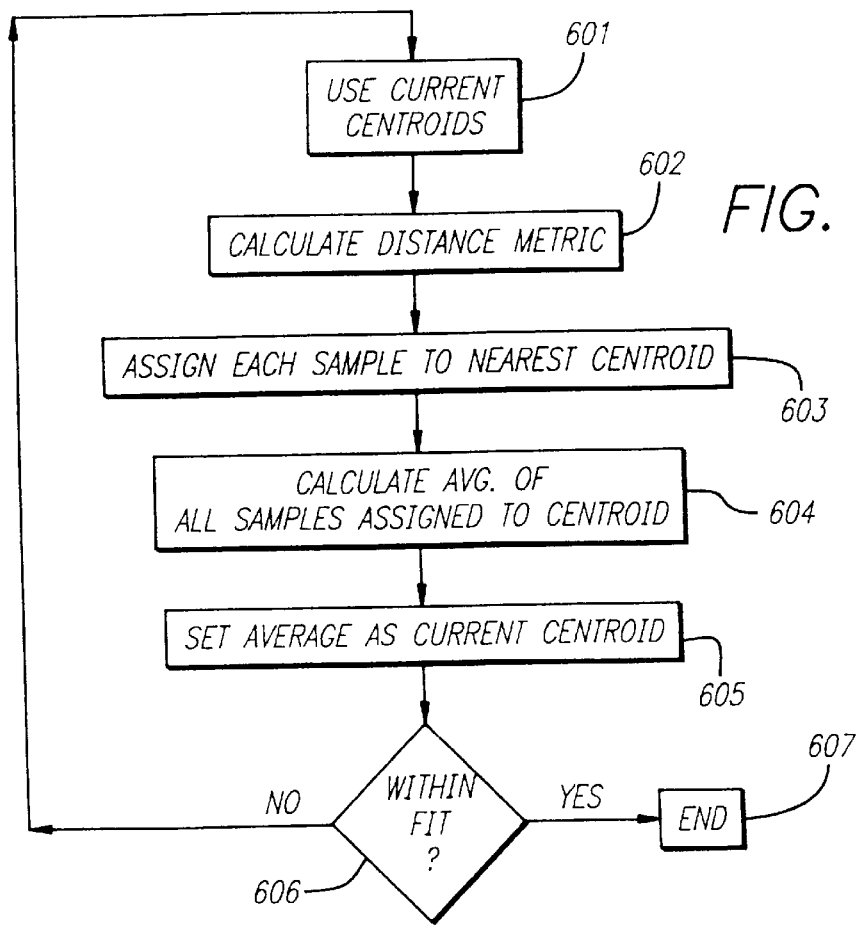
FIG. 6 is a process flow diagram of the color quantizing step of the present invention.

The process flow of the color quantizing step is illustrated in FIG. 6. At step 601, the system obtains the current centroids. A centroid is, for purposes of this patent application, a color (location) which is a candidate to be one of the entries on the optimized color table. In the preferred embodiment of the present invention, during the first pass of the color quantization, there are no current centroids. Therefore a convention is used whereby the most populated bins of the histogram are selected as the initial current centroid locations.

At step 602, the distance metric is calculated for each centroid. The distance metric measures the distance of every sample to every centroid. Initially, there are 256 centroids and potentially millions of samples. At step 603, each sample is assigned to its nearest centroid. In other words, after the distance metric has been calculated each sample will be nearer to one centroid than to all others, and the sample is assigned to that nearest centroid. At step 604, each centroid is reviewed and the population-weighted average of all the samples assigned to that centroid is calculated. At step 605, the averages that have been calculated for each centroid are set as the new current centroids.

At decision block 606, the argument "within fit parameters?" is made. If the argument is true, meaning that a close enough fit has been determined, the system proceeds to step 607 and ends. If the argument is false, the system returns to step 601. Code illustrating the color quantizing step of the present invention is illustrated in Appendix 3B.

When the fit of the centroids is within the predetermined parameters, the optimal colors for the color table have been found. In the preferred embodiment of the present invention, this step yields 256 colors. Some biasing of the quantized colors is performed to insure certain results. For example, the 256 quantized colors are predetermined to include black and white. The colors may also be biased to flesh tones to provide more pleasing display of those colors.

Centroid Calculation Step

The preferred embodiment of the present invention uses a technique known as the optimum mean square, or Lloyd-Max quantizer, to quantize the color space. Sample quantization is well known in the art. The Lloyd-Max quantizer is described, for example, in "Fundamentals of Digital Image Processing", Anil K. Jain, Prentice Hall, 1989, pp 101 et seq, incorporated herein by reference. Color image quantization is also described in "Digital Image Processing" William K. Pratt, John Wiley & Sons, 1978, pp 155 et seq, also incorporated herein by reference.

The Lloyd-Max quantizer attempts to find decision levels and reconstruction levels for a quantizer such that the mean square error is minimized. One disadvantage of the straight-forward application of the Lloyd-Max quantizer to data as part of a compression scheme is the relative slowness of the quantizer. The Lloyd-Max quantizer is computationally intensive and has not been used in prior art symmetrical compression schemes. In addition to its slowness, the quantizer is biased to find a local optimum quantized result, not a global optimum result. The present invention proposes techniques to permit the use of the Lloyd-Max quantizer and others like it in a compression scheme.

Stochastic Relaxation (Annealing)

Traditional application of the Lloyd-Max quantizer as described above requires the calculation of the average of all samples associated with a current centroid to determine a new current centroid. In the preferred embodiment of the present invention, instead of using the calculated average value as the new current centroid, "noise" is added to the average value. This average value plus noise is used as the new current centroid. This step may increase the number of iterations before the centroid "fit" is within the desired limits. However, it yields a better (more pleasing) result.

In the present invention, noise is added on a gradually decreasing schedule, e.g. exponentially decreasing at a certain rate, until during the last few iterations there is no noise added at all. Theoretically, the rate of decrease should be on an infinite schedule in order to reach the global maximum. However, a faster rate of decrease allows the system to reach a global maximum. Without the annealing step, the algorithm would lead to a local maximum. The amount of noise added should initially be greater than the amount of movement that would occur between iterations if no noise were added. This amount can be determined on a case by case basis and can be determined by trial runs during color quantization.

Distance Calculation

The present invention provides a scheme for reducing the number of distance calculations that need to be executed during each pass or iteration of the Lloyd-Max quantizer. The present invention tracks, at each pass or iteration, the quantized value of each sample color. That is, for each observed 24-bit color (from the histogram) the system stores an associated quantized color from the previous iteration.

After each iteration, the eight immediate centroid neighbors of each centroid are determined and stored in a table. The set of centroids partitions the perceptual color space into Voronoi regions, where the Voronoi region of a centroid is defined as the locus of points that are closer to that centroid than to all other centroids. (By way of example, soap bubbles in foam each have a plurality of neighbors with Voronoi boundaries defined by the soap bubble boundaries and where they touch other soap bubbles. A neighbor is any bubble that shares a boundary with a soap bubble).

For each centroid, the system looks at all the other centroids and keeps track of eight closest centroids in a table. Instead of measuring the distance of each sample to every centroid, the system only measure distances between a sample and the previously closest centroid and its eight nearest neighbor centroids. The assumption is made that the centroid does not move beyond the previous region or its eight nearest neighbors in an iteration. This significantly reduces the computation required in each iteration. When the assumption is incorrect, when it does move further, the algorithm merely needs more than one iteration to reach the target. An example of code suitable for implementing this is one embodiment of the present invention is illustrated in Appendix 4.

The method used by the preferred embodiment of the present invention to determine the nearest neighbor centroids begins by selecting a centroid of interest and defining a three dimensional space around it, with the space divided into axis-aligned octants. The octant of each candidate neighbor centroid is determined. That candidate's distance is then compared to the previous best (closest) distance of a centroid in that octant. If the candidate neighbor is closer than the previously closest centroid in that octant, it replaces that previous centroid as the new closest centroid in the octant. The closest centroid is determined for each octant, leading to eight close neighbors for each centroid.

A flow diagram illustrating the neighbor centroid calculation is illustrated in FIG. 7. At step 701 a "center" centroid (a centroid whose neighbors are to be determined) is selected. At step 702 a candidate neighbor centroid is selected. At step 703 the octant of the candidate centroid is determined. At decision block 704 the argument "Candidate centroid closer than current closest centroid in octant?" is made. If the argument is true, the candidate centroid becomes the current closest centroid in that octant at step 705 and the system moves to decision block 706. If the argument at decision block 704 is false, the current closest centroid in the octant remains closest, and the system proceeds to decision block 706.

At decision block 706 the argument "All candidate neighbor centroids examined?" is made. If the argument is true, the system has checked all potential neighbor centroids for that center centroid and creates a table of neighbor centroids for that center centroid at step 707 and then proceeds to decision block 708. If the argument at decision block 706 is false, the system returns to step 702.

At decision block 708 the argument "All center centroids examined for neighbors?" is made. If the argument is true, the system ends the neighbor centroid calculation. If the argument at decision block 708 is false, the system returns to step 701 and selects the next center centroid.

Quantize Pixels 305

After the color table has been quantized, each pixel of the source image must be assigned a new color from the quantized color table. This can be accomplished in several ways. One method is to use a binary decision tree that uses the quantized boundaries in perceptual color space. Each boundary is a decision plane. All pixels that fall on one side of the plane belong to that group and all pixels that fall on the other side belong to the other group. The decision tree method of assigning colors can be accomplished given adequate memory resources.

Another scheme for quantizing the pixels is to use caches. The preferred embodiment of the present invention uses a temporal color quantizing cache and a spatial color quantizing cache. The temporal cache is used to check whether a pixel is the same color as the previous pixel in the same location or the same as the pixel before that, or the same as the corresponding pixel in a background. It can be specified how far back the temporal cache looks. If the pixel is the same, there is no need to do any calculation or distance computation, only to copy the assigned quantized color to the current pixel. When a background is relatively fixed for some period of time, this reduces significantly the computations that need to be performed to quantize the pixels.

The spatial color quantizing cache stores recently seen colors that are not present in the temporal color quantizing cache. That is, the spatial cache stores actual pixel colors that have already been assigned quantized colors, but that are not already in the temporal cache. When a color is encountered that misses the temporal cache, the spatial cache is checked. If the color misses both caches, a distance calculation is performed to assign a quantized color.

The distance calculation would normally require the measuring of the distance between the sample color and each of the quantized colors (i.e. 256 distance calculations in the preferred embodiment). The present invention provides a scheme for reducing and eliminating some of the distance calculations that need to be performed for each sample. This is accomplished by keeping track of a currently closest quantized color for a sample, and halting a distance calculation for another quantized color when it is determined that the distance is greater than the current closest.

A sample is compared to the first quantized color in the color table and the distance between the sample and the quantized color is calculated. That quantized color is defined as the best fit, and the distance is stored. When the sample is compared to the next quantized color in the color table, only the "x" distance is calculated (faster than calculating all three dimensions) and is compared with the stored xyz distance of the current best fit. If the x distance of the new quantized color is greater than the xyz distance of the best fit, then the xyz distance of the new quantized color must also be greater, and the new quantized color is eliminated as a best fit candidate, and no more calculations are performed.

If the x distance of the new quantized color is less than the xyz distance of the current best fit, the xy distance of the new quantized color is calculated and the xy distance of the new quantized color is compared to the xyz distance of the best fit color. If the xy distance of the new quantized color is greater than the xyz distance of the best fit, then the xyz distance of the new quantized color must also be greater, and the new quantized color is eliminated as a best fit candidate, and no more calculations are performed.

If the xy distance of the new quantized color is less than the xyz distance of the current best fit, the xyz distance of the new quantized color is calculated and the xyz distance of the new quantized color is compared to the xyz distance of the best fit color. If the xyz distance of the new quantized color is greater than the xyz distance of the best fit, the new quantized color is eliminated as a best fit candidate, the current best fit remains, and the system proceeds to the next quantized color. If the xyz distance of the new quantized color is less than the xyz distance of the best fit, the new quantized color becomes the best fit, and the system proceeds to the next quantized color.

Figure 8:
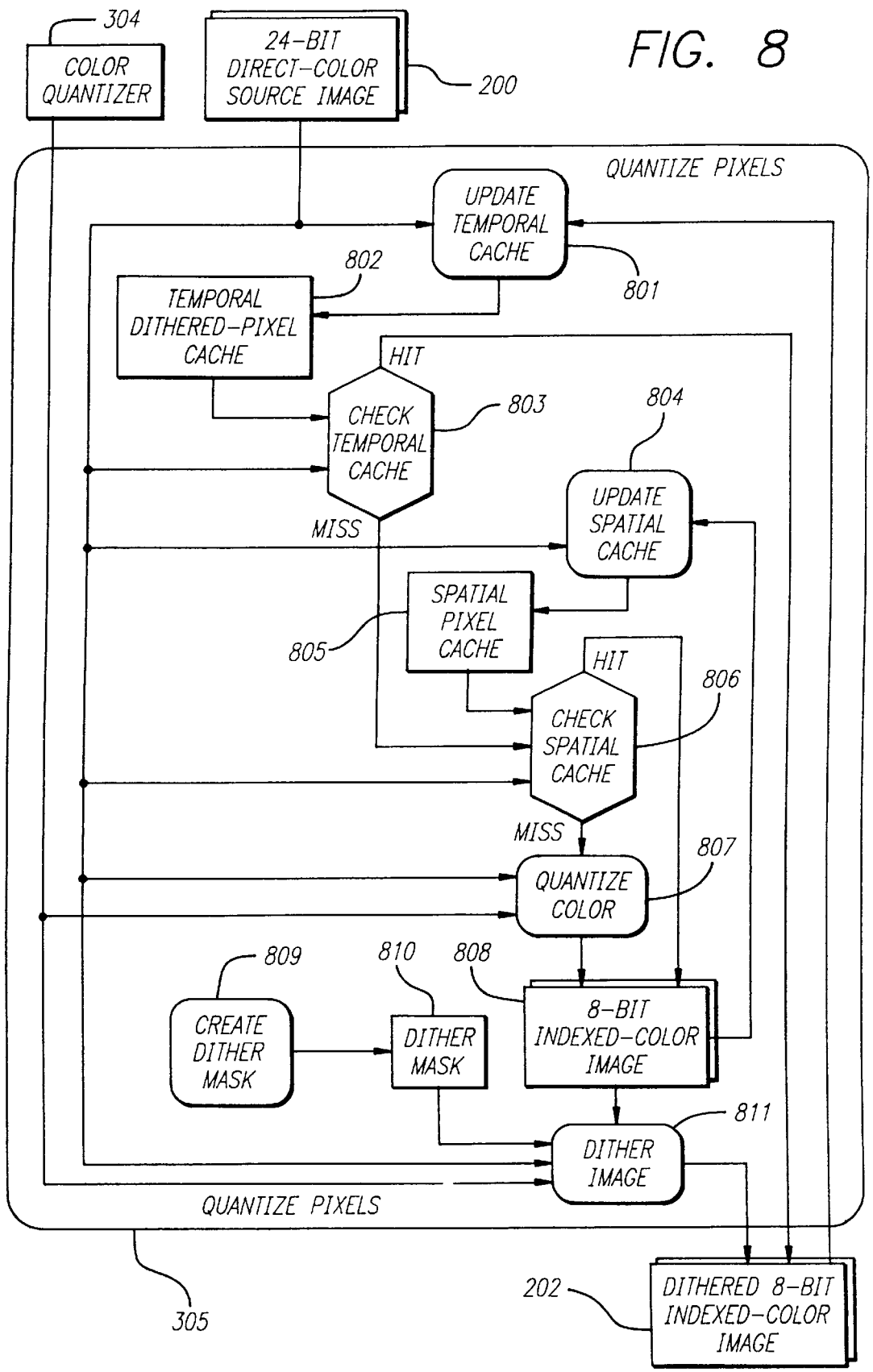
FIG. 8 is an information flow diagram of the operation of the pixel quantizing step of FIG. 3.
Figure 9C:
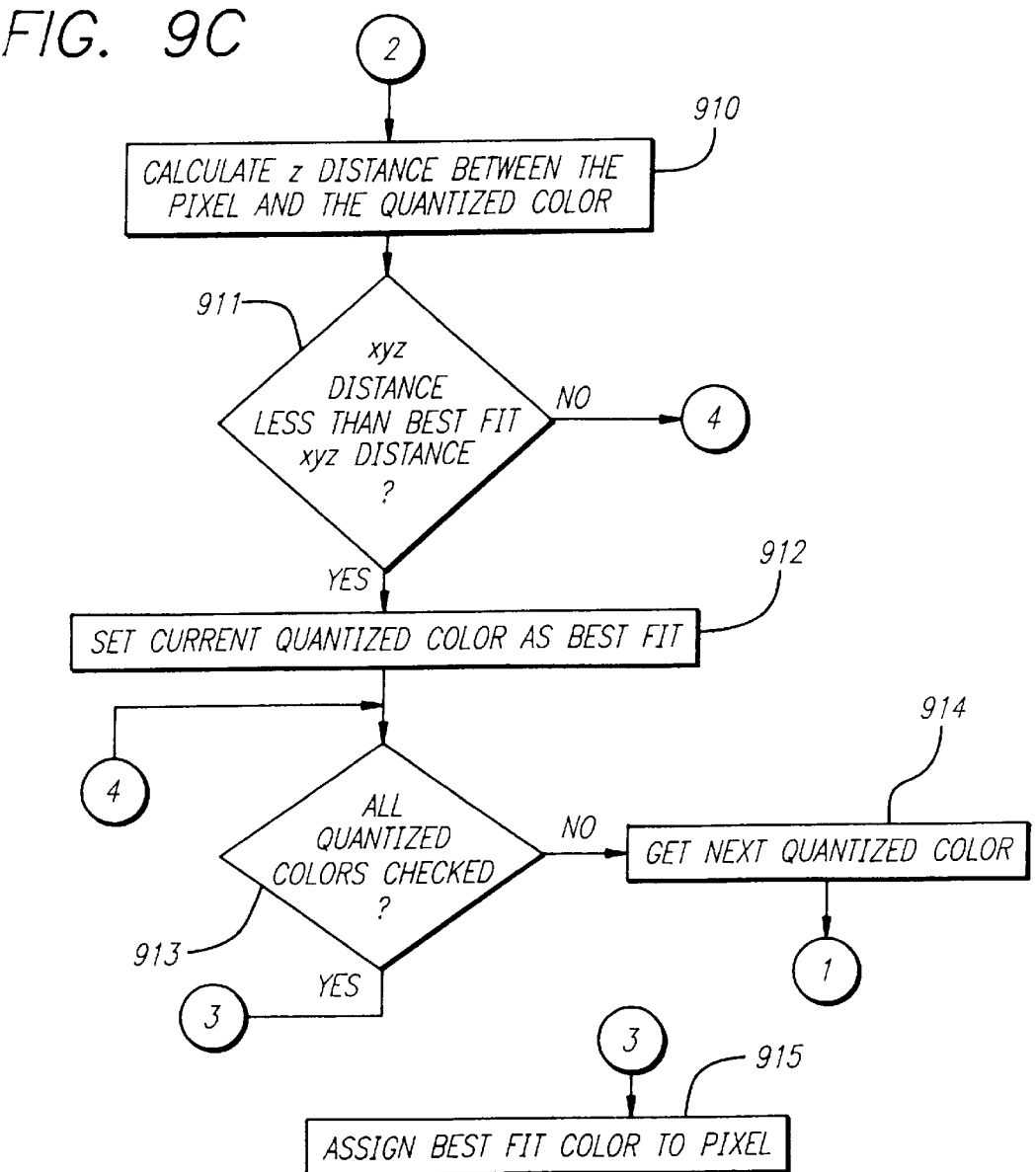
Figure 9D:
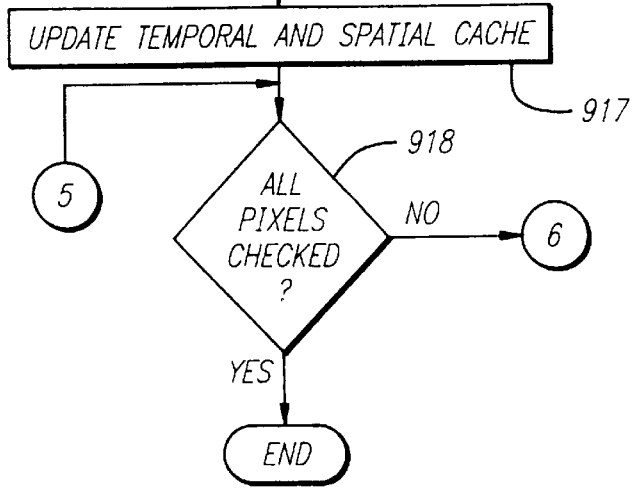

FIG. 8 is a detailed information flow diagram of the quantized pixels step 305 of FIG. 3. The source image 200 is used to access sample pixels for quantizing. The sample pixels are provided to update temporal cache step 801, to generate a temporal dithered pixel cache 802. The temporal cache 802 stores the color and quantized color of the pixel at the same location as the current sample pixel for a number of previous frames (in the preferred embodiment, the background frame and the immediately preceding frame). The temporal cache 802 is checked at decision block 803 to determine if the color of the sample pixel is the same color as at the corresponding location in the temporal cache. If there is a hit, the system assigns the quantized color to the pixel and proceeds to the dithered 8-bit index color 202 If there is a miss, the system proceeds to check the spatial cache. The spatial pixel cache 805 stores recently indexed colors that do not appear in the temporal cache 802. In the preferred embodiment of the present invention, the spatial cache stores 16 recent colors. The spatial cache 805 is checked at decision block 806. If there is a hit, the system assigns the quantized color to the pixel and proceeds to the 8-bit index color image 808.

If there is a miss at spatial cache 805, the system proceeds to the quantized color step 807 and calculates the appropriate quantized color for the pixel as described above. At step 809, a dither mask 810 is created. The dither mask is applied to the indexed color image 808 at dither image step 811 to generate a dithered 8-bit indexed color image 202. The indexed color image 808 is used to update spatial cache 805 at step 804. The dithered color image 202 issued to update temporal cache 802 at step 801.

A process flow diagram of the quantize pixel operation of the present invention is illustrated in FIGS. 9A–9D. At step 901 in FIG. 9A, a pixel is obtained from the source image. At step 902 the color of the pixel is compared to the color (or colors) stored in the temporal cache at a location corresponding to the pixel frame location. At decision block 903 the argument "Temporal cache hit?" is made. If the argument is true, the system proceeds to step 916 and assigns the appropriate quantized color to the pixel. If the argument at decision block 903 is false, the system proceeds to step 904 and compares the color of the pixel to the colors stored in the spatial cache.

At decision block 905 the argument "Spatial cache hit?" is made. If the argument is true, the system proceeds to step 916 and assigns the appropriate quantized color to the pixel. If the argument at decision block 905 is false, the system proceeds to step 906 of FIG. 9B.

At step 906 the x distance between the pixel and a quantized color from the color table is determined. At decision block 907 the argument "x distance less than best fit xyz distance?" is made. If the argument is false, the system proceeds to decision block 913 of FIG. 9C. If the argument is true, the system proceeds to step 908 and calculates the y distance between the pixel and the quantized color.

At decision block 909 the argument "xy distance less than best fit xyz distance?" is made. If the argument is false, the system proceeds to decision block 913. If the argument is true, the system proceeds to step 910 of FIG. 9C and calculates the z distance between the pixel and the quantized color.

At decision block 911 the argument "xyz distance less than best fit xyz distance?" is made. If the argument is false, the system proceeds to decision block 913. If the argument is true, the system proceeds to step 912 and sets the current quantized color as the best fit color.

At decision block 913 the argument "All quantized colors checked?" is made. If the argument is false, the next quantized color is obtained at step 914 and the system returns to step 906 of FIG. 9B. If the argument is true, the current best fit quantized color is assigned to the pixel at step 915 of FIG. 9D. After step 915 and 916, the system proceeds to step 917 in FIG. 9D and updates the temporal cache and the spatial cache as appropriate. The system then proceeds to decision block 918 and the argument "All pixels checked?". If the argument is false, the system returns to step 901 of FIG. 9A and gets the next pixel for assignment. If the argument is true the process ends. An example of code that implements the quantizing pixels step of the present invention is illustrated in Appendix 5. The code in appendix 5 includes branching that can be used for different processing environments. If the processor used to perform the quantization has a fast multiplier, such as a PowerPC, the scheme described above can be used. For processors without fast multipliers, the distance is first culled with a so-called "Manhattan (L1) distance calculation before performing the squared Euclidian (L2) distance.

Dithering

In the preferred embodiment of the present invention, dithering is applied to the quantized image to improve appearance. Any of a plurality of well known dithering techniques suited for application to movies can be used in the present invention. In the present invention, a quarter-dithering scheme is used. A dither mask is generated for the entire image, so that the period of resolution is at the edge of a frame. This corresponds to the create dither mask step 809 of FIG. 8. The image is divided into 2×2 cells and a decision is made (randomly) to add noise to the lower left and upper right pair or to the upper left and lower right pair. The amount of noise to be added is also randomly determined. By using 2×2 cells, the dither pattern is as fine as possible, without coarse patterns resulting. By using diagonals within the cells, "hard" effects are avoided. In the present invention, the dithering takes place after quantizing the color space but before quantizing the film.

TEMPORAL COMPRESSION

The next step in the compression process of the present invention is temporal compression. The purpose of this step is to reduce the number of pixels that need to be updated to the display during each screen update cycle. The goal is to identify only those pixels that change significantly from frame to frame so that substantially only those pixels need to be updated and pixels that do not change significantly are not updated needlessly.

In the preferred embodiment of the present invention it is desired to have a display rate of 15 frames per second. With each frame having 640×480 8 bit pixels, many computers cannot update every pixel at a rate of 15 frames per second. The present invention provides a solution by dividing each frame into tiles. Each frame is divided into a series of 4×4 tiles. A difference computation is made between successive frames to identify those tiles that have pixels that have changed significantly between frames.

The frames are stored in sequence. For a self-contained movie, the first frame is stored in its entirety. (In an interactive scene in which each movie returns the scene to the same rest state, the first frame only changes the tiles that have changed from the rest state). Each successive frame is compared to the frame before to determine what tiles have changed significantly between frames. A bit mask is created for each frame after the first frame that identifies the tiles that are to be stored for that frame. The tiles of each frame are stored with skip codes that are used to identify the location of the tile to be displayed.

In one embodiment of the invention, a fixed background can be specified and stored separately so that tiles from the background are only stored once and updated from that storage location, saving space.

In operation, the first tile is read by the system and, since there are no changes, all of the colors of the pixels are stored in a table as the most recently used colors for that pixel location. For the next frame, the color of each pixel is compared to the color of the previous pixel at that location. This is accomplished by converting both colors to a perceptual color space, measuring the distance between them, and weighting this distance by the time since the pixel was last updated. This difference is referred to as the "salience" of the change to the new pixel from the old pixel. If the difference is within a certain threshold such that it can be considered that the new color is not significantly changed from the old color, the originally stored color is used for the new pixel and a bit mask is built so that the new pixel does not get updated. The amount of change may be any amount of change that produces an acceptable result to the viewer. Correspondingly, the amount of change to be used is subjective. In the preferred embodiment of the present invention, acceptable results have been obtained when the amount of change is less than approximately 3% of the extent of the perceptual color space.

In the preferred embodiment, this comparison is done on a tile by tile basis. If the change in the tile as a whole exceeds the difference threshold, the entire tile is displayed, even those pixels that may have not changed significantly. If any pixel in a tile exceeds the threshold difference, the entire tile is displayed, even those pixels that may have not changed significantly.

If none of the pixels in a tile exceed the threshold, the display of that tile is not changed. For each successive frame, the pixels are compared not to the most recent tile, but to the most recently displayed colors. Because the bit mask is based on tiles, it is only 1/16th the size of a bit mask that was based on pixels. Code for implementing the temporal compression step of the present invention is illustrated in Appendix 6.

Figure 10:
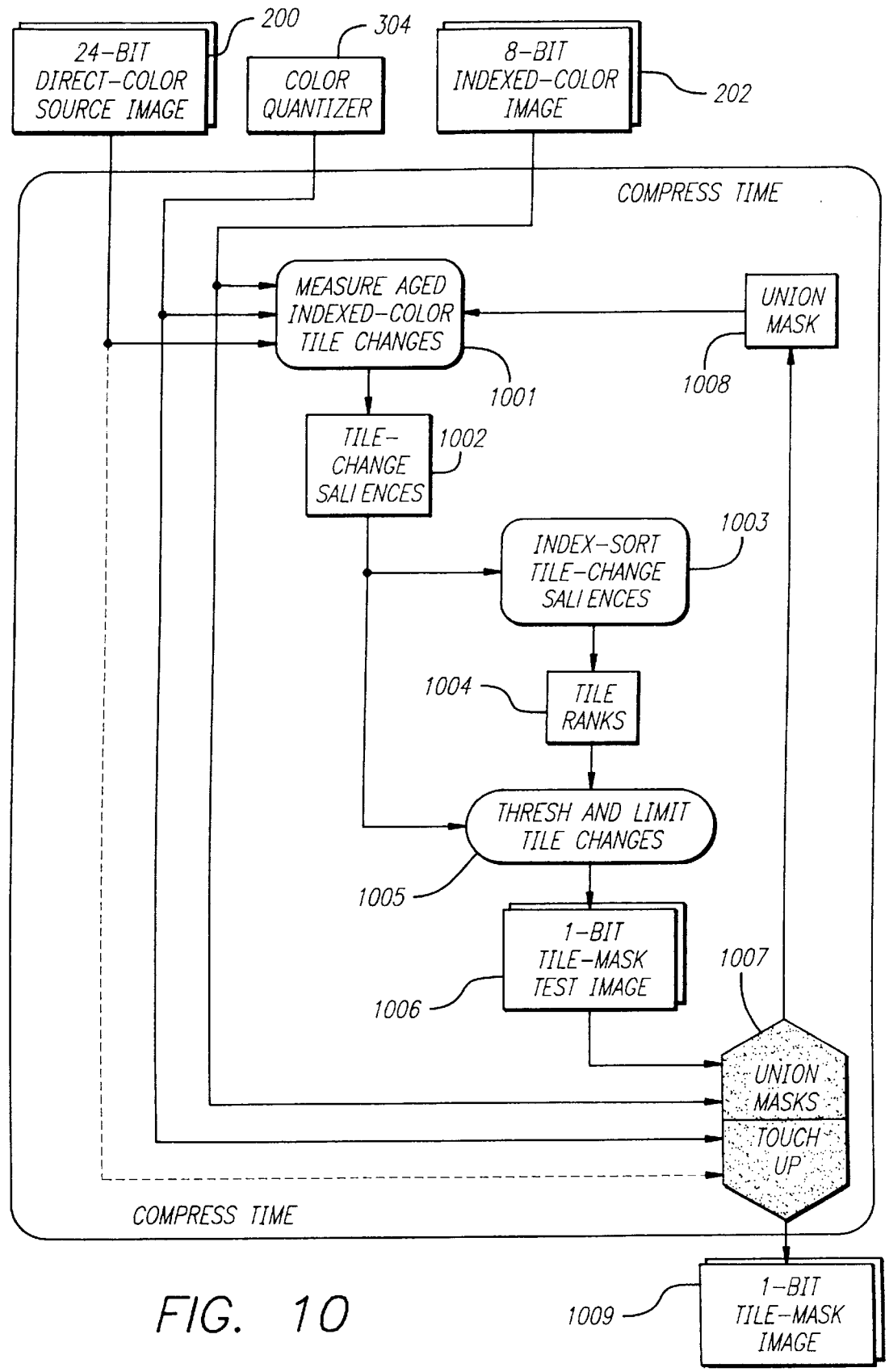
FIG. 10 is an information flow diagram of the temporal compression of the present invention.

FIG. 10 is an information flow diagram of the temporal compression of the present invention. The source image 200, color quantizer 304 and indexed color image 202 are all used by the "measure aged indexed-color tile changes" step 1001. This step results in tile change saliences 1002 as described above. These tile changes are used by the index sort tile-change saliences step 1003 to produce tile ranks 1004. The tile-change saliences 1002 and tile ranks 1004 are used by thresh and limit tile changes step 1005 to generate a 1 bit tile mask test image 1006. The source image 200, color quantizer 304, indexed color image 202, and test image 1006 are used by the union mask/touch up step 1007. Step 1007 results in a union mask 1008 and/or a 1 bit tile mask image 1009.

SPATIAL COMPRESSION

The purpose of spatial compression in the present invention is to reduce the storage space required on, for example, a CD-ROM, and to reduce the retrieval bandwidth. The movie is stored as a series of tiles that are then read off the CD-ROM and provided to the display. The tiles are stored in a tile table and are indexed. The indexes are stored on the CD-ROM. As a result, a tile can be used and displayed many times, but need only be stored once. The scheme for generating and use of the tile tables depends on the type of movie that is being compressed. The present invention contemplates sequential movies that are viewed in a specific order from start point to end point, and random access movies where the order of viewing is dynamic. Often video or computer games employ random access movies where the sequence depends on user choices during game play.

Random Access Movies

In the present invention, a fixed tile table is used for random access movies. This requires building a single tile table that is the best fit for the random access movie. This is accomplished with a tile quantizer. The system processes the film and builds the tile table as it goes. When each tile is encountered it is compared to tiles that are in the tile table to see if the tile is within the parameters of a "best fit" for any of the tiles in the table. If the tile is not a best fit, it is added to the tile table. For the early frames, of course, most of the tiles will be added to the tile table.

Sequential Movies

For a sequential movie, the tile table can be dynamic, that is the tile members can change as needed. This is possible because the tiles can be scheduled and brought into the table as needed.

For tile scheduling, the movie is gone through forward to identify where each tile gets used and create an oversized tile table. Then the system goes through the movie backwards and schedules the entry of the tile into the table so that it is available when the movie is played.

The tile fit step is similar to the temporal compression color distance measuring step of the temporal compression step. Each tile is compared to the tiles in the tile table. The comparison involves converting the colors of the pixel in the new tile and the colors of the pixels in the tile table tile and calculating the distance. If the distance is within a predetermined fit, the existing tile in the tile table is used in place of the new tile. If the new tile is not within the fit parameters of any of the existing members of the tile table, the tile is added to the tile table. As noted above, the degree of fit may be chosen subjectively, however, a degree of fit that is no more than approximately 3% of the extent of the perceptual color space produces acceptable results.

Figure 11:
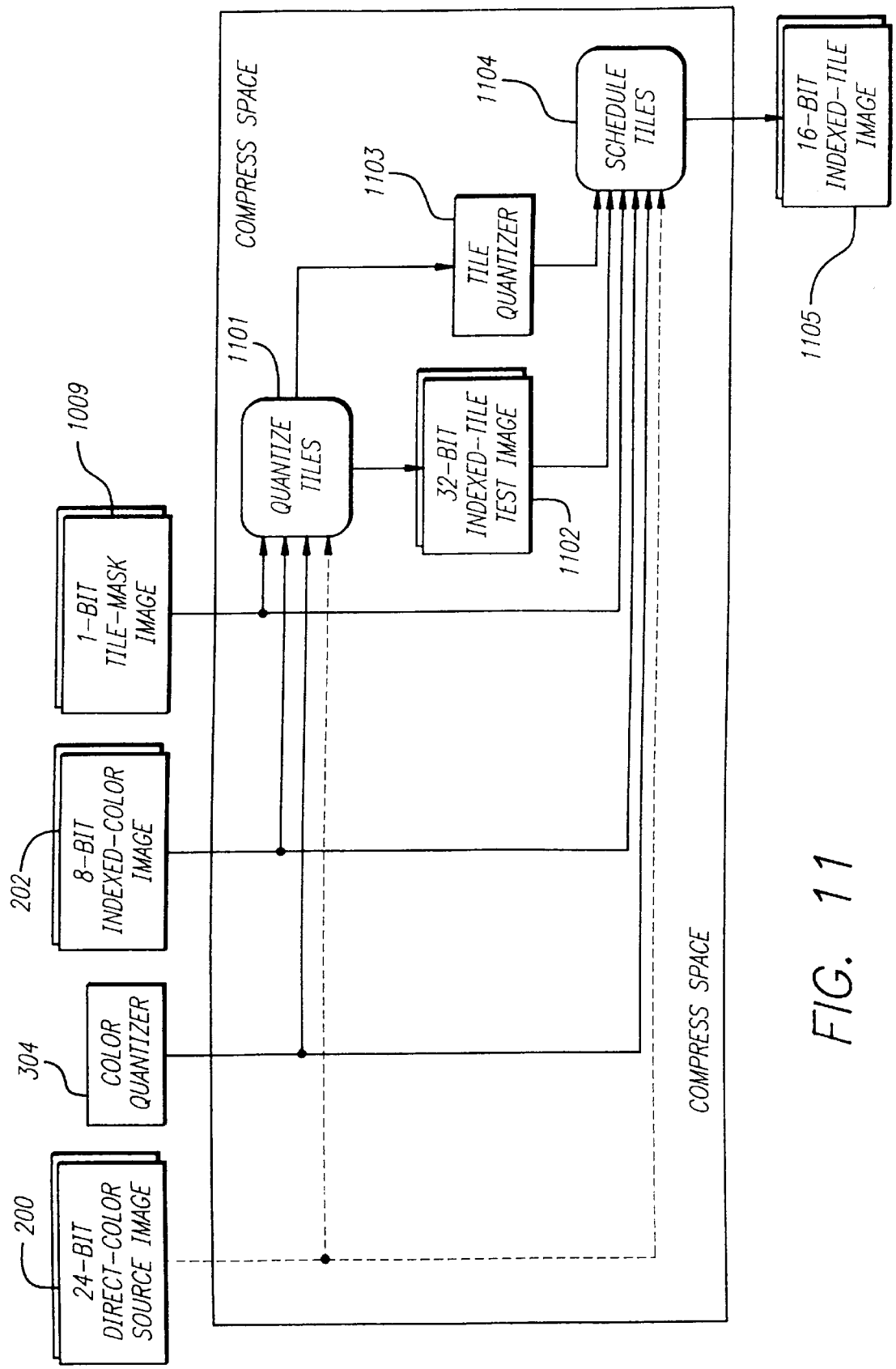
FIG. 11 is an information flow diagram of the spatial compression of the present invention.

An information flow diagram of the spatial compression of the present invention is illustrated in FIG. 11. Source image 200, color quantizer 304, indexed-color image 202 and tile-mask image 1009 are provided to quantize tiles step 1101. Quantize tiles step 1101 generates an indexed tile test image 1102 and tile quantizer 1103. These are provided, along with source image 200, color quantizer 304, indexed-color image 202 and tile-mask image 1009, to schedule tiles step 1104 to produce 16 bit indexed tile image 1105. Code for implementing the spatial compression of the present invention is illustrated in Appendixes 7 and 7A.

Figure 13:
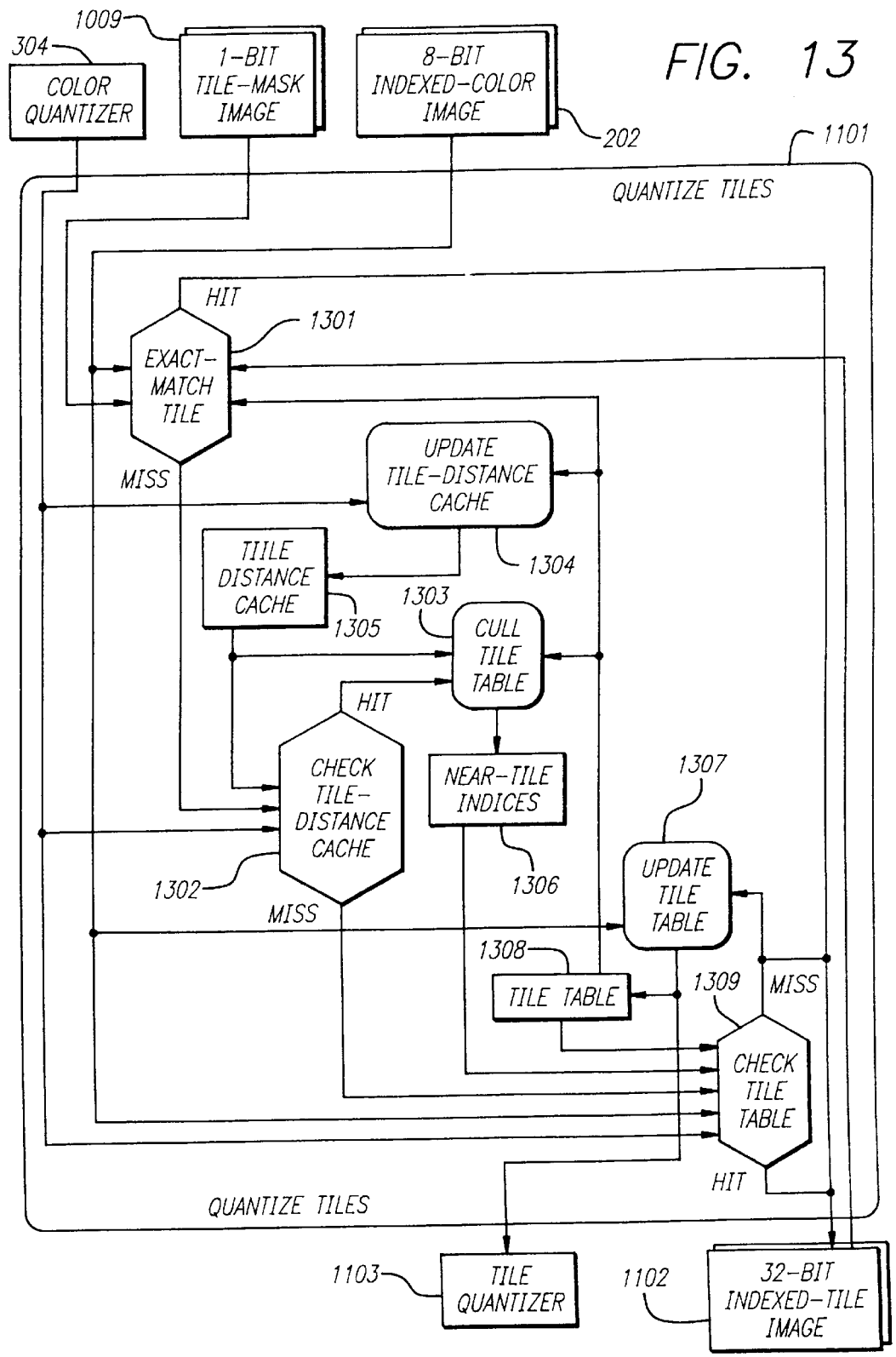
FIG. 13 is an information flow diagram illustrating tile quantizing.

FIG. 13 is an information flow diagram of the quantize tile step 1101 of FIG. 11. The quantize tile step uses the color qauntizer 304, the tile-mask images 1009, and the indexed-color images 202 to result in the tile quantizer 1103 and indexed-tile images 1102. At step 1301 the exact match tile step is performed to see if the tile under consideration is an exact match with any cached tiles or table tiles. The exact match comparison is a fast operation and avoids slower steps if there is a match. This step is described in connection with FIG. 14. If there is a hit during the exact match tile step 1301, the tile index is provided to the indexed-tile images 1102. If there is not a match at step 1301, the system performs the check tile distance cache step 1302. The tile distance cache contains a number of tiles for which the distance between themselves and every tile in the tile table is known. The distance of the current tile is compared to the members of the tile distance cache and the closest tile distance cache tile is determined. By using the triangle inequality, tiles that could not possibly be a match based on the closest tile are culled (eliminated) so that distance calculations do not need to be performed on those eliminated tiles. Tiles that are not eliminated result in the near-tile indices 1306.

If there is no tile in the tile distance cache 1305 to use to cull the tile table, the system performs the check tile table step 1309 and calculates the closeness of the tile under consideration to the tile table members. If there is a close enough match, the index is given to the indexed-tile images 1102. If there is no close fit, the tile is added to tile table 1308 at update tile table step 307. The tile distance cache is updated at step 1304.

Figure 14:
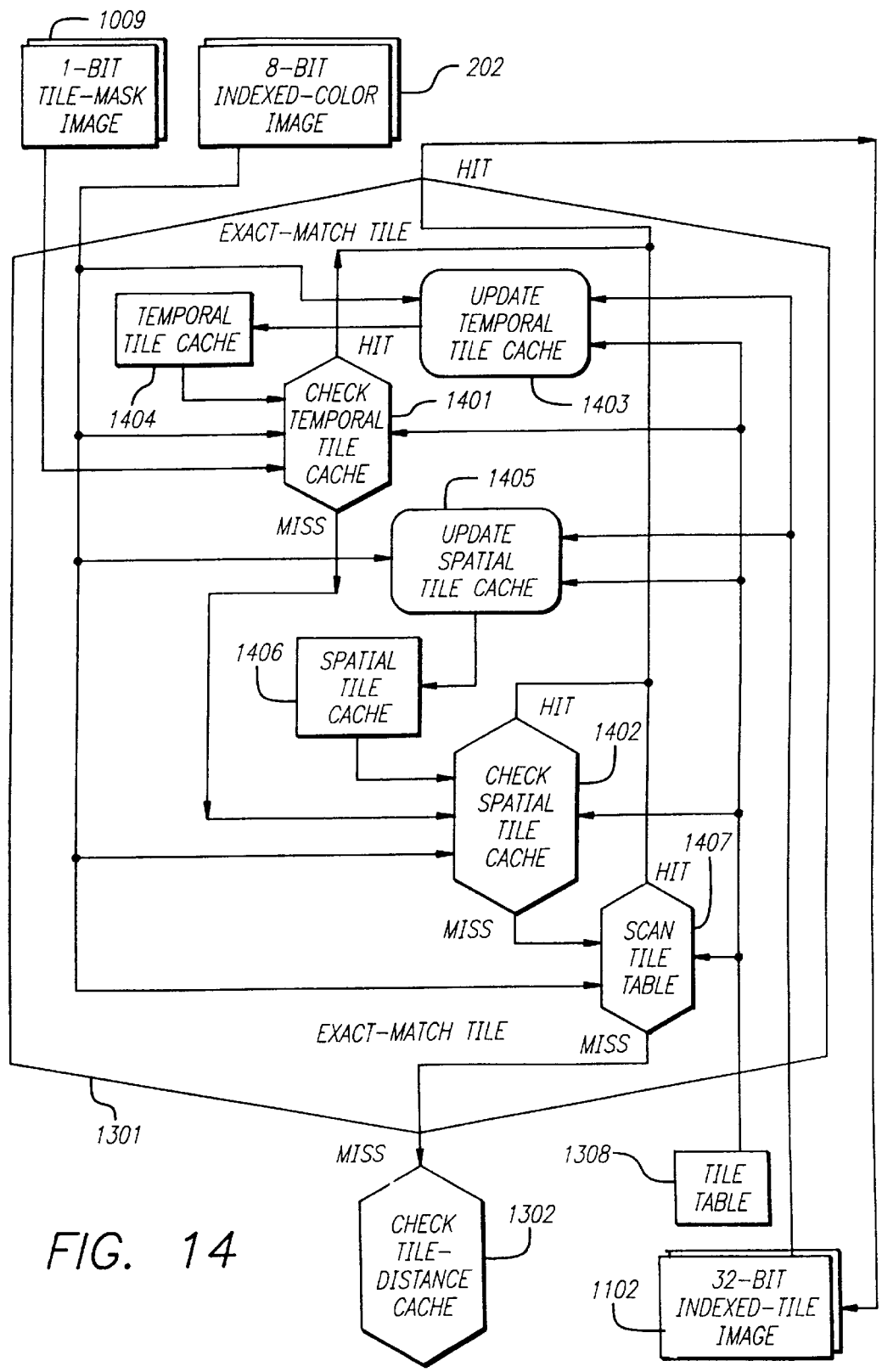
FIG. 14 is an information flow diagram illustrating the exact match tile step of FIG. 13.

The exact tile match step 1301 is illustrated in the flow diagram of FIG. 14. Tile-mask images 1009 and indexed-color images 202 result in tile table 1308 and indexed-tile images 1102. At step 1401 the temporal tile cache 1404 is checked for an exact match. The temporal tile cache stores tiles in the same location in previous frames, or in the background. If there is a hit in the temporal tile cache 1404, the tile index is provided to the indexed-tile images 1102. If there is no match, the spatial tile cache 1406 is checked at step 1402. The spatial tile cache 1406 stores recently seen tiles. If there is a hit the index is given to the indexed-tile images 1102. If there is a miss, the system proceeds to the scan tile table step 1407 to look for an exact match. If there is a hit, the index is provided to the indexed-tile image 1102. If there is a miss, the system proceeds to the check tile-distance cache step 1302 of FIG. 13. The temporal tile cache 1404 is updated by update temporal tile cache step 1403. Update spatial tile cache step 1405 is used to update cache 1406.

DECOMPRESSION

Figure 12:
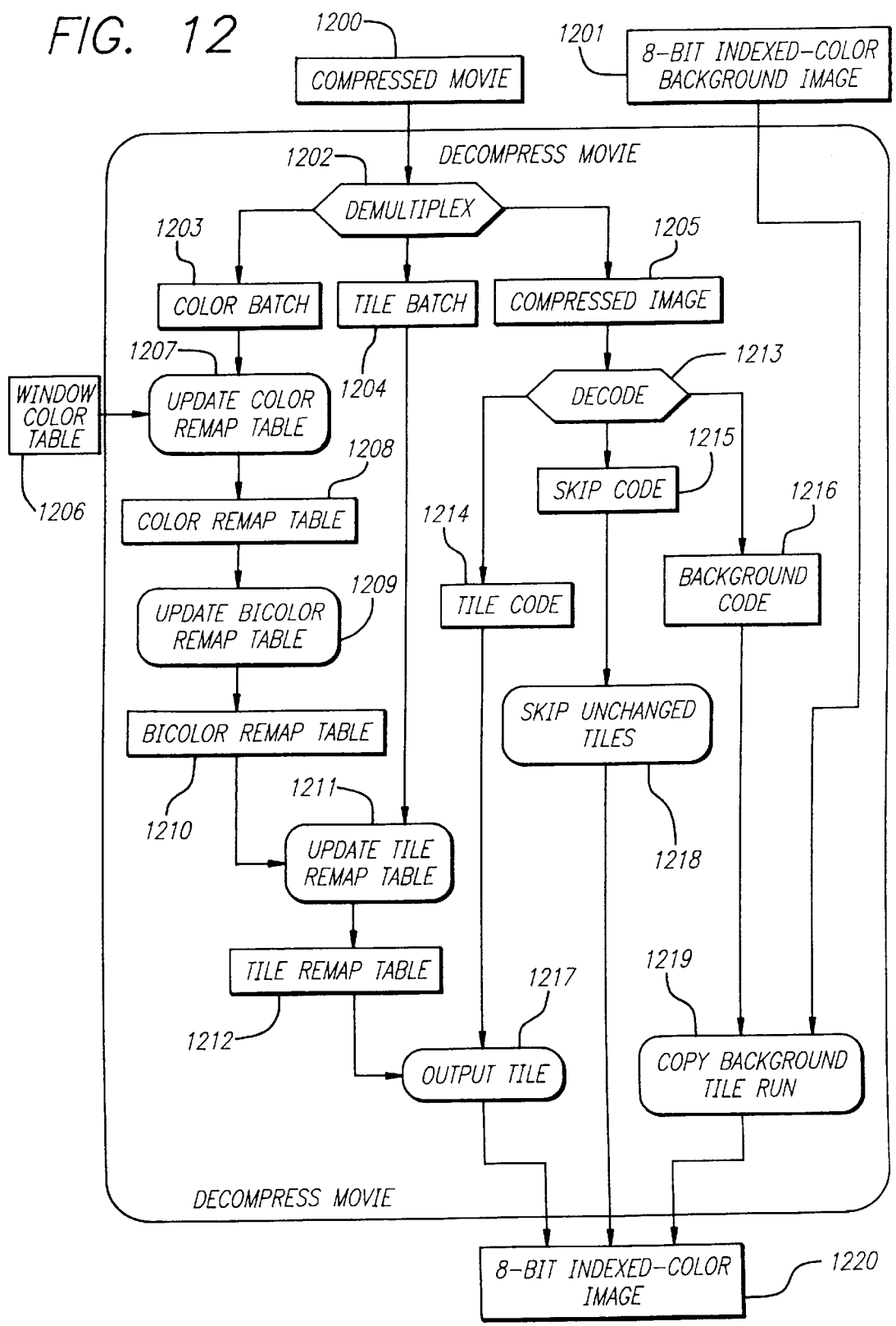
FIG. 12 is an information flow diagram illustrating the decompression of the present invention.

To play back a compressed movie stored on a CD-ROM, a color table is built on the host computer, the tile table is downloaded and the data is extracted for display. An information flow diagram illustrating the decompression of the present invention is illustrated in FIG. 12. The compressed movie 1200 is stored on a CD-ROM. The data is passed through a demultiplexer 1202 to separate the color batch 1203, tile batch 1204 and the compressed image 1205.

The color batch 1203 is used with the window color table 1206 (from the host computer system) in the update color remap table step 1207 to map the colors in the quantized color table to the best colors in the computer system to generate a color remap table 1208. The color remap table is used by update bicolor remap table step 1209 to generate bicolor remap table 1210. Tile batch 1204 and bicolor remap table 1210 are used by update tile remap table step 1211 to generate tile remap table 1212.

Compressed image 1205 is used by decode step 1213 to generate tile codes 1214, skip codes 1215, and background codes 1216. Tile code 1214 and tile remap table 1212 are used by output tile step 1217; skip code 1215 is used by skip unchanged tiles step 1218; and background code 1216 is used by copy background tile run 1219 to generate 8 bit indexed color image 1220. Code for implementing the decompression of the present invention is illustrated in Appendix 8.

---

Appendix 1: Histogram Sampling-Rate Reduction Algorithm:

Initialize the variables:
        Set the sample index to the sample interval.
        Set the sample time to a pseudorandom integer in the sample interval.
        Initialize the pseudorandom variable.
    For each sample:
        Decrement the sample index.
        If the sample index equals the sample time,
            Increment the population of the bin.
        If the sample index equals zero,
            Reset the sample index to the sample interval.
            Reset the sample time to a pseudorandom number in the sample interval.

Appendix 2: Binary-Search Histogram Decimation Algorithm:

Initialize the variables:
        Count the total population.
        Set epsilon to the reciprocal of the total population.
        Set the low decimation fraction to zero.
        Set the high decimation fraction to one.
        Count the number of populated bins.
        Set the mid decimation fraction to the target bin count divided by the populated bin count.
    If the target bin count is less than the populated bin count:
        Do:
            Set the guessed fraction to the mid fraction.
            Compute the decimated bin count at the guessed fraction.
            If the decimated bin count would be less than the target bin count,
                Reset the low fraction to the guessed fraction plus epsilon.
            else
                Reset the high fraction to the guessed fraction minus epsilon.
            Reset the mid fraction to the truncated mean of the low and high fractions.
        until the decimated bin count equals the target bin count or the low fraction is greater than the high fraction.
        Decimate the histogram at the guessed fraction:
        Set the decimated bin count to zero.
        Initialize the pseudorandom variable.
        For each populated bin in the histogram:
            Multiply the bin's population by the guessed decimation fraction.
            Add a pseudorandom fraction in the range [0 . . . 1].
            Reset the bin population to the integer part of the resulting population.

Appendix 3A

Requantize a color:
    Initialize the closest centroid to the previous closest centroid for this color.
    Initialize the best distance to the squared distance from the previous closest centroid.
    For each neighbor:
        If this neighbor is not identical to the current best centroid, -continued

```
            Compute the squared distance from the color to this
neighbor along the first dimension.
                If the best distance is greater than this distance,
                    Compute the squared distance from the color to this
neighbor along the second dimension.
                    Add this to the one-dimensional distance.
                    If the best distance is greater than this distance,
                        Compute the squared distance from the color to this
neighbor along the third dimension.
                        Add this to the two-dimensional distance.
                        If the best distance is greater than this distance,
                            Reset the closest centroid to this neighbor.
                            Reset the best distance to this distance.
Appendix 3B Color-Space Quantization Iteration Algorithm:
    Initialize the centroid deviations to zero.
    Initialize the centroid populations to zero.
    Compute the distances between each pair of centroids.
    Compute the octahedral neighborhood of each centroid.
    For each color in the color histogram:
        Requantize this color in the neighborhood of its adjusted centroid.
        Store the new centroid for this color.
        Increment the population of this centroid.
        Accumulate the deviation of this color from this centroid.
    For each adjustable centroid:
        Normalize this centroid's deviation by this centroid's population.
        Perturb the deviation with pseudorandom noise according to the
annealing schedule.
        Add the deviation to the centroid.
Appendix 4

Find the Octahedral Neighborhood of a Centroid:
    For each octant:
        Initialize this octant's best distance to the maximum
representable value.
        Initialize this octant's closest neighbor to the centroid itself.
    For each centroid:
        If this centroid is not identical to the centroid,
            Initialize the octant index to zero.
            If this centroid's first dimension is not less than the
centroid's,
                Add one to the octant index.
            If this centroid's second dimension is not less than the
centroid's,
                Add two to the octant index.
            If this centroid's third dimension is not less than the
centroid's,
                Add four to the octant index.
            If the best distance in this octant is greater than this
centroid's distance to the centroid,
                Reset this octant's best distance to this centroid's
distance to the centroid.
                Reset this octant's neighbor to this centroid.
Appendix 5

Quantize a Pixel:
    For each previous pixel at this location in the temporal cache,
        If this cached pixel is equal to the pixel,
            Set the closest centroid to that of the cached pixel.
    If the pixel was not in the temporal cache,
        For each pixel in the spatial cache,
            If this cached pixel is equal to the pixel,
                Set the closest centroid to that of the cached pixel.
    If the pixel was not in either cache,
        If this machine has a fast multiplier:
            Initialize the best distance to the largest representable
value.
            For each centroid:
                Compute this centroid's squared distance to the
color along the first dimension.
                If the best distance is greater than this distance,
                    Compute this centroid's squared distance to the
color along the second dimension.
                    Add this to the one-dimensional distance.
                    If the best distance is greater than this distance,
                        Compute this centroid's squared distance to
the color along the third dimension.
                        Add this to the two-dimensional distance.
                        If the best distance is greater than this
distance,
                            Reset the closest centroid to this
centroid.
                            Reset the best distance to this
distance.
        Else if this machine adds and branches much faster than it
multiplies:
            Initialize the best distance to the largest representable
value.
            For each centroid:
                Compute and store the Manhattan distance between the
color and this centroid.
                If the best distance is greater than this distance,
                    Reset the best distance to this distance.
            Set the distance threshold to the best Manhattan
distance times the square root of three.
            Initialize the best distance to the largest representable
value.
            For each centroid:
                If this centroid's Manhattan is less than the
distance threshold,
                    Compute this centroid's squared distance to
the color along the first dimension.
                    If the best distance is greater than this
distance,
                        Compute this centroid's squared
distance to the color along the second dimension.
                        Add this to the one-dimensional
distance.
                        If the best distance is greater than this
distance,
                            Compute this centroid's
squared distance to the color along the third dimension..
                            Add this to the two-dimensional
distance.
                            If the best distance is greater than
this distance,
                                Reset the closest centroid
to this centroid.
                                Reset the best distance to this
distance.
    Replace the oldest entry in the spatial cache with this pixel.
    Replace the oldest entry in the temporal cache with this pixel.
Appendix 6

Limit Interframe Changes:
For each tile:
    If a global mask is being used and this tile is masked out,
        Set this tile's change salience to zero.
    Else
        Test this tile for equality to the previous tile in the same
location:
            Compare one 4-byte-aligned 4-pixel row of the tile at a
time.
        If this tile is equal to the previous tile,
            Set this tile's change salience to zero.
        Else
        Compute the distance between this tile and the previous tile
in the same location:
            Initialize the intertile distance to zero.
            For each pixel in the tile:
                Look up the squared distance between this pixel
and the previous pixel in the same location.
                Add this squared distance to the intertile distance.
            Multiply the intertile distance by the tile's weighted
age.
            Set this tile's change salience to the aged intertile
distance.
        If a global copy-mask is being used and this tile is masked in,
            Set this tile's change salience to the smallest representable
positive value.
    Quicksort the tiles change saliences, by tile index.
    Binary search to the first tile under the change threshold, by tile
index.
    Set the changed tile count to this index.
    If the changed tile count is greater than the allowable changed tile
count,
        Set the changed tile count to the allowable changed tile count.
```

-continued

```
    For all tiles up to the changed tile count, by tile index:
        Set the tile mask bit to one.
    For all remaining tiles,
        Set the tile mask bit to zero.
```

Appendix 7

```
Tile Quantization Algorithm:
    If the tile is masked out for this frame,
        Set the closest tile index to that of the currently displayed tile at this location.
    Else
        For each previous tile at this location in the temporal cache,
            If this cached tile is equal to the tile (comparing four pixels at a time),
                Set the closest tile index to that of the cached tile.
        If the tile was not in the temporal cache,
            For each file in the tile cache,
                If this cached tile is equal to the tile (comparing four pixels at a time),
                    Set the closest tile index to that of the cached tile.
            If the tile was not in either exact-match cache,
                For each tile in the tile table,
                    If this tile is equal to the tile (comparing four pixels at a time),
                        Set the closest tile index to that of this tile.
                If the tile was not found,
                    Initialize the best cache distance to the largest representable value.
                    For each tile in the tile-distance cache:
                        If this tile is closer to the tile than the best cache distance,
                            Reset the best cache distance to this distance.
                            Reset the best cache-tile index to this index.
                    If the best distance is less than the distance threshold,
                        Set the inner radius to zero.
                    Else
                        Set the inner radius to the best distance minus the distance threshold.
                    Set the outer radius to the best distance plus the distance threshold.
                    Find the inner radius in the distance table for the cached tile by indexed binary search.
                    Find the outer radius in the distance table for the cached tile by indexed binary search.
                    If a small enough fraction of tiles are between the inner and outer radii, use the distance cache:
                        Initialize the best distance to the largest representable value.
                        For each tile in the tile table:
                            Look up the distance from the cached tile to this tile.
                            Compute the absolute difference between the best cache distance and this distance.
                            If this difference is less than the distance threshold,
                                If this tile is closer to the tile than the best distance,
                                    Reset the best distance to this distance.
                                    Reset the best tile index to this index.
                    Else
                        If the tile-distance cache is not full and a large enough fraction of tiles are between the inner and outer radii,
                            Add this tile to the tile-distance cache.
                            Store the distance of this tile to each tile in the table;
                        Quicksort the distances by index.
                        Initialize the best distance to the largest representable value.
                        For each tile in the tile table:
                            If this tile is closer to the tile than the best cache distance,
                                Reset the best distance to this distance.
                                Reset the best tile index to this index.
                    If the best distance is greater than the distance threshold,
                        Add the tile to the tile table.
                        Set the closest tile index to that of the added tile.
                        Store the distance of this tile to each tile in the tile distance cache.
                        Insert the index of this tile in the appropriate in each tile-distance index table.
                    Else
                        Set the closest tile index to the best tile index.
                    If the tile was not i the spatial cache,
                        Replace the oldest entry in the spatial cache with this tile.
                    If the tile was not in the temporal cache,
                        Replace the oldest entry in the temporal cache with this tile.
```

Appendix 7A

```
Check if this tile is closer to the tile than the best distance:
    Look up the distance between the colors of th first pixel.
    If this distance is less than the best distance,
        For each of the next four pixels:
            Look up the distance between the colors of this pixel.
            Add this distance to the total.
        If the total distance is less than the best distance,
            For each of the remaining pixels:
                Look up the distance between the colors of this pixel.
                Add this distance to the total.
            If the total distance is less than the best distance,
                This tile is closer to the tile than the best distance,
            Else
                This tile is not closer to the tile than the best distance.
        Else
            This tile is not closer to the tile than the best distance.
    Else
        This tile is not closer to the tile than the best distance.
```

Appendix 8

```
Movie Frame Decompression:
    Initialize the tile display position to the top left of the output image.
    For each code batch in the frame:
        Determine the batch type.
        If this is a color batch,
            For each color in the color batch;
                Decode the color index.
                Decode the color.
                If the operating system permits,
                    Change the previous color corresponding to this index to this color.
                Find the index of the closest available window color to this color.
                Store the best window-color index in the color remap table at the color index.
                Update the row and column of the color index in the bicolor remap table.
        Else if this is a tile batch,
            For each tile in the tile batch:
                Decode the tile index.
                Decode the tile.
                Remap the colors in the tile to the window-color indices, two pixels at a time, using the bicolor remap table.
                Store the remapped tile in the tile remap table at the tile index.
        Else if this is a compressed image,
            For each code in the compressed image:
                Determine the code type.
                If this is a skip code,
                    Decode the skip.
                    Move the display position by the indicated number of tile rows and columns.
                Else if this is a tile code,
                    Decode the tile index.
                    Copy the remapped tile from the tile table at this index to the display position.
                    Increment the display position to the next tile.
                Else if this is a background code,
                    Decode the background run-length.
                    Copy the indicated number of tiles from the background to the display position.
                    Move the display position to after the background run.
```

We claim:

1. A method for performing phased compression of color images comprised of a plurality of sequenced frames, comprising the steps of:

performing color compression on a sequence of color images to generate a color quantizer and a sequence of indexed color images;

performing temporal compression on said sequence of color images to generate a tile mask; and performing spatial compression on said sequence of color images to generate a tile table and a plurality of indexed tile images;

wherein said step of performing color compression comprises the steps of:

forming a color histogram from samples of color pixels in said sequence of color source images;

generating said color quantizer by partitioning a color space based on said color histogram, said step of generating said color quantizer comprises the step of determining a set of color centroids to represent said color pixels; and quantizing said color pixels using said color quantizer;

wherein said step of determining a set of color centroids comprises the steps of:

determining in said color space a distance metric between each respective sample in said histogram and a plurality of current centroids, said plurality of current centroids residing in an immediate neighborhood of a Voronoi region of a centroid to which the respective sample was assigned in a prior iteration;

assigning each sample in said histogram to a closest current centroid; and adjusting said current centroids based on an accumulation of deviations between each current centroid and a plurality of respectively assigned samples.

2. A method for performing phased compression of color images comprised of a plurality of sequenced frames, comprising the steps of:

performing color compression on a sequence of color images to generate a color quantizer and a sequence of indexed color images;

performing temporal compression on said sequence of color images to generate a tile mask; and performing spatial compression on said sequence of color images to generate a tile table and a plurality of indexed tile images;

wherein said step of performing color compression comprises the steps of:

forming a color histogram from samples of color pixels in said sequence of color source images;

generating said color quantizer by partitioning a color space based on said color histogram; and quantizing said color pixels using said color quantizer, said step of quantizing said color pixels comprising the steps of:

maintaining a temporal cache for each pixel location in a frame, said temporal cache comprising a previous color pixel value and respective quantized color pixel value in each pixel location of said frame; and assigning a quantized color pixel value of a matching previous color pixel to a current color pixel if such a match exists at a current pixel location.

3. A method for performing phased compression of color images comprised of a plurality of sequenced frames, comprising the steps of:

performing color compression on a sequence of color images to generate a color quantizer and a sequence of indexed color images;

performing temporal compression on said sequence of color images to generate a tile mask; and performing spatial compression on said sequence of color images to generate a tile table and a plurality of indexed tile images;

wherein said step of performing color compression comprises the steps of:

forming a color histogram from samples of color pixels in said sequence of color source images;

generating said color quantizer by partitioning a color space based on said color histogram; and quantizing said color pixels using said color quantizer, said step of quantizing said color pixels comprising the steps of:

maintaining a spatial cache of nearby color pixels in a frame, wherein said nearby color pixels have already been quantized, said spatial cache comprising said nearby color pixels and respective quantized color pixel values; and assigning a quantized color pixel value of a matching nearby color pixel to a current color pixel if such a match exists.

4. A method for performing phased compression of color images comprised of a plurality of sequenced frames, comprising the steps of:

performing color compression on a sequence of color images to generate a color quantizer and a sequence of indexed color images;

performing temporal compression on said sequence of color images to generate a tile mask; and performing spatial compression on said sequence of color images to generate a tile table and a plurality of indexed tile images;

wherein said step of performing color compression comprises the steps of:

forming a color histogram from samples of color pixels in said sequence of color source images;

generating said color quantizer by partitioning a color space based on said color histogram;

quantizing said color pixels using said color quantizer by determining a closest centroid to a current color pixel and assigning a quantized color value of said closest centroid to said current color pixel;

wherein said step of determining said closest centroid comprises the steps of:

calculating a first distance between said current color pixel and a first centroid, storing said first distance as a closest distance;

for subsequent centroids, determining whether each of said subsequent centroids is closer to said current color pixel than said closest distance;

if one of said subsequent centroids is closer than said closest distance, storing a distance between said current color pixel and said one of said subsequent centroids as said closest distance;

after considering all centroids, defining a centroid associated with said closest distance as said closest centroid.

5. A method for performing phased compression of color images comprised of a plurality of sequenced frames, comprising the steps of:

performing color compression on a sequence of color images to generate a color quantizer and a sequence of indexed color images;

performing temporal compression on said sequence of color images to generate a tile mask; and performing spatial compression on said sequence of color images to generate a tile table and a plurality of indexed tile images, said step of performing spatial compression comprising the steps of:

partitioning each frame into a plurality of n×n tiles of color pixels; and quantizing said tiles to form said tile table and said indexed tile images;

maintaining a distance cache containing a plurality of cache tiles and calculated distances between said plurality of cache tiles and each tile in said tile table;

wherein said step of quantizing said tiles comprises the steps of:

determining whether a current tile is an exact match of an already-quantized tile;

if said current tile is not an exact match, determining a distance between said current tile and a nearest tile in said tile table; and if said distance is greater than a distance threshold, adding said current tile to said tile table;

wherein said step of determining said distance between said current tile and said nearest tile in said tile table comprises the steps of:

determining a nearest cache tile in said distance cache with respect to said current tile;

based on said calculated distances between said nearest cache tile and each tile in said tile table, determining a set of near tiles from said tile table; and determining distances between said near tiles and said current tile to determine said nearest tile.

6. A computer program product comprising:

a computer usable medium having computer readable program code embodied therein for performing phased compression of color images comprised of a plurality of sequenced frames, said computer program product comprising;

computer readable program code configured to cause a computer to perform color compression on a sequence of color images to generate a color quantizer and a sequence of indexed color images;

computer readable program code configured to cause a computer to perform temporal compression on said sequence of color images to generate a tile mask; and computer readable program code configured to cause a computer to perform spatial compression on said sequence of color images to generate a tile table and a plurality of indexed tile images;

wherein said computer readable program code configured to cause a computer to perform color compression comprises:

computer readable program code configured to cause a computer to form a color histogram from samples of color pixels in said sequence of color source images;

computer readable program code configured to cause a computer to generate said color quantizer by partitioning a color space based on said color histogram, said computer readable program code configured to cause a computer to generate said color quantizer comprising computer readable program code configured to cause a computer to determine a set of color centroids to represent said color pixels; and computer readable program code configured to cause a computer to quantize said color pixels using said color quantizer;

wherein said computer readable program code configured to cause a computer to determine a set of color centroids comprises:

computer readable program code configured to cause a computer to determine in said color space a distance metric between each respective sample in said histogram and a plurality of current centroids, said plurality of current centroids residing in an immediate neighborhood of a Voronoi region of a centroid to which the respective sample was assigned in a prior iteration;

computer readable program code configured to cause a computer to assign each sample in said histogram to a closest current centroid;

computer readable program code configured to cause a computer to adjust said current centroids based on an accumulation of deviations between each current centroid and a plurality of respectively assigned samples.

7. A computer program product comprising:

a computer usable medium having computer readable program code embodied therein for performing phased compression of color images comprised of a plurality of sequenced frames, said computer program product comprising;

computer readable program code configured to cause a computer to perform color compression on a sequence of color images to generate a color quantizer and a sequence of indexed color images;

computer readable program code configured to cause a computer to perform temporal compression on said sequence of color images to generate a tile mask; and computer readable program code configured to cause a computer to perform spatial compression on said sequence of color images to generate a tile table and a plurality of indexed tile images;

wherein said computer readable program code configured to cause a computer to perform color compression comprises:

computer readable program code configured to cause a computer to form a color histogram from samples of color pixels in said sequence of color source images;

computer readable program code configured to cause a computer to generate said color quantizer by partitioning a color space based on said color histogram; and computer readable program code configured to cause a computer to quantize said color pixels using said color quantizer, said computer readable program code configured to cause a computer to quantize said color pixels comprising:

computer readable program code configured to cause a computer to maintain a temporal cache for each pixel location in a frame, said temporal cache comprising a previous color pixel value and respective quantized color pixel value in each pixel location of said frame; and computer readable program code configured to cause a computer to assign a quantized color pixel value of a matching previous color pixel to a current color pixel if such a match exists at a current pixel location.

8. A computer program product comprising:

a computer usable medium having computer readable program code embodied therein for performing phased compression of color images comprised of a plurality of sequenced frames, said computer program product comprising;

computer readable program code configured to cause a computer to perform color compression on a sequence of color images to generate a color quantizer and a sequence of indexed color images;

computer readable program code configured to cause a computer to perform temporal compression on said sequence of color images to generate a tile mask; and computer readable program code configured to cause a computer to perform spatial compression on said sequence of color images to generate a tile table and a plurality of indexed tile images;

wherein said computer readable program code configured to cause a computer to perform color compression comprises:

computer readable program code configured to cause a computer to form a color histogram from samples of color pixels in said sequence of color source images;

computer readable program code configured to cause a computer to generate said color quantizer by partitioning a color space based on said color histogram; and computer readable program code configured to cause a computer to quantize said color pixels using said color quantizer, said computer readable program code configured to cause a computer to quantize said color pixels comprising:

computer readable program code configured to cause a computer to maintain a spatial cache of nearby color pixels in a frame, wherein said nearby color pixels have already been quantized, said spatial cache comprising said nearby color pixels and respective quantized color pixel values; and computer readable program code configured to cause a computer to assign a quantized color pixel value of a matching nearby color pixel to a current color pixel if such a match exists.

9. A computer program product comprising:

a computer usable medium having computer readable program code embodied therein for performing phased compression of color images comprised of a plurality of sequenced frames, said computer program product comprising;

computer readable program code configured to cause a computer to perform color compression on a sequence of color images to generate a color quantizer and a sequence of indexed color images;

computer readable program code configured to cause a computer to perform temporal compression on said sequence of color images to generate a tile mask; and computer readable program code configured to cause a computer to perform spatial compression on said sequence of color images to generate a tile table and a plurality of indexed tile images;

wherein said computer readable program code configured to cause a computer to perform color compression comprises:

computer readable program code configured to cause a computer to form a color histogram from samples of color pixels in said sequence of color source images;

computer readable program code configured to cause a computer to generate said color quantizer by partitioning a color space based on said color histogram; and computer readable program code configured to cause a computer to quantize said color pixels using said color quantizer by determining a closest centroid to a current color pixel and assigning a quantized color value of said closest centroid to said current color pixel;

wherein said computer readable program code configured to cause a computer to determine said closest centroid comprises:

computer readable program code configured to cause a computer to calculate a first distance between said current color pixel and a first centroid;

computer readable program code configured to cause a computer to store said first distance as a closest distance;

computer readable program code configured to cause a computer to determine, for subsequent centroids, whether each of said subsequent centroids is closer to said current color pixel than said closest distance;

computer readable program code configured to cause a computer to store a distance between said current color pixel and said one of said subsequent centroids as said closest distance if one of said subsequent centroids is closer than said closest distance;

computer readable program code configured to cause a computer to define, after considering all centroids, a centroid associated with said closest distance as said closest centroid.

10. A computer program product comprising:

a computer usable medium having computer readable program code embodied therein for performing phased compression of color images comprised of a plurality of sequenced frames, said computer program product comprising;

computer readable program code configured to cause a computer to perform color compression on a sequence of color images to generate a color quantizer and a sequence of indexed color images;

computer readable program code configured to cause a computer to perform temporal compression on said sequence of color images to generate a tile mask; and computer readable program code configured to cause a computer to perform spatial compression on said sequence of color images to generate a tile table and a plurality of indexed tile images, said computer readable program code configured to cause a computer to perform spatial compression comprising:

computer readable program code configured to cause a computer to partition each frame into a plurality of n×n tiles of color pixels; and computer readable program code configured to cause a computer to quantize said tiles to form said tile table and said indexed tile images;

computer readable program code configured to cause a computer to maintain a distance cache containing a plurality of cache tiles and calculated distances between said plurality of cache tiles and each tile in said tile table;

wherein said computer readable program code configured to cause a computer to quantize said tiles comprises:

computer readable program code configured to cause a computer to determine whether a current tile is an exact match of an already-quantized tile;

computer readable program code configured to cause a computer to determine a distance between said current tile and a nearest tile in said tile table if said current tile is not an exact match; and computer readable program code configured to cause a computer to add said current tile to said tile table if said distance is greater than a distance threshold;

wherein said computer readable program code configured to cause a computer to determine said distance between said current tile and said nearest tile in said tile table comprises:

computer readable program code configured to cause a computer to determine a nearest cache tile in said distance cache with respect to said current tile;

computer readable program code configured to cause a computer to determine a set of near tiles from said tile table based on said calculated distances between said nearest cache tile and each tile in said tile table; and computer readable program code configured to cause a computer to determine distances between said near tiles and said current tile to determine said nearest tile.

11. A method for performing phased compression of color images comprised of a plurality of sequenced frames, comprising the steps of:

in a first phase, performing color compression on a sequence of color images to generate a color quantizer and a sequence of indexed color images;

in a second phase, performing temporal compression on said sequence of color images to generate a tile mask; and in a third phase, performing spatial compression on said sequence of color images to generate a tile table and a plurality of indexed tile images;

wherein performing temporal compression comprises the steps of:

partitioning each frame into a plurality of n×n tiles of color pixels;

determining a distance between one or more color pixels in a respective tile and one or more corresponding color pixels in a previously displayed and similarly located tile;

adding said distances to form an intertile distance;

scaling said intertile distance by a weighted age of said previously displayed tile; and setting a tile change salience to said scaled intertile distance;

forming said tile mask based on said tile change salience for a frame, said tile mask specifying which of said tiles to display and which of said tiles to skip.

12. A computer program product comprising:

a computer usable medium having computer readable program code embodied therein for performing phased compression of color images comprised of a plurality of sequenced frames, said computer program product comprising;

computer readable program code configured to cause a computer to, in a first phase, perform color compression on a sequence of color images to generate a color quantizer and a sequence of indexed color images;

computer readable program code configured to cause a computer to, in a second phase, perform temporal compression on said sequence of color images to generate a tile mask; and computer readable program code configured to cause a computer to, in a third phase, perform spatial compression on said sequence of color images to generate a tile table and a plurality of indexed tile images;

wherein said computer readable program code configured to cause a computer to perform temporal compression comprises:

computer readable program code configured to cause a computer to partition each frame into a plurality of n×n tiles of color pixels;

computer readable program code configured to cause a computer to determine a tile change salience for each tile in a frame;

computer readable program code configured to cause a computer to form said tile mask based on said tile change saliences for a frame, said tile mask specifying which of said tiles to display and which of said tiles to skip;

wherein said computer readable program code configured to cause a computer to determine said tile change salience comprises:

computer readable program code configured to cause a computer to determine a distance between each color pixel in a respective tile and each corresponding color pixel in a previously displayed and similarly located tile;

computer readable program code configured to cause a computer to add said distances to form an intertile distance;

computer readable program code configured to cause a computer to scale said intertile distance by a weighted age of said previously displayed tile; and computer readable program code configured to cause a computer to set said tile change salience to said scaled intertile distance.

13. A computer program product comprising:

a computer usable medium having computer readable program code embodied therein for performing phased compression of color images comprised of a plurality of sequenced frames, said computer program product comprising;

computer readable program code configured to cause a computer to, in a first phase, perform color compression on a sequence of color images to generate a color quantizer and a sequence of indexed color images;

computer readable program code configured to cause a computer to, in a second phase, perform temporal compression on said sequence of color images to generate a tile mask; and computer readable program code configured to cause a computer to, in a third phase, perform spatial compression on said sequence of color images to generate a tile table and a plurality of indexed tile images;

wherein said computer readable program code configured to cause a computer to perform spatial compression comprises:

computer readable program code configured to cause a computer to partition each frame into a plurality of n×n tiles of color pixels; and computer readable program code configured to cause a computer to quantize said tiles to form said tile table and said indexed tile images;

wherein said computer readable program code configured to cause a computer to quantize said tiles comprises:

computer readable program code configured to cause a computer to determine whether a current tile is an exact match of an already-quantized tile;

computer readable program code configured to cause a computer to determine a distance between said current tile and a nearest tile in said tile table if said current tile is not an exact match, said distance determined by calculating a distance between a first tile and a second tile by summing distances between respective color pixel values via a table containing precalculated distances between a plurality of pairs of possible color pixel values; and computer readable program code configured to cause a computer to add said current tile to said tile table if said distance is greater than a distance threshold.

14. The method of claim 1, wherein said immediate neighborhood comprises a set of centroids containing a closest neighboring centroid in each axis-aligned octant.

15. The method of claim 1, wherein said step of adjusting said current centroids comprises the steps of:

for each current centroid, adding said accumulation of deviations to generate a weighted average of all assigned samples; and adding noise to each of said current centroids on a decreasing schedule.

16. The method of claim 1, wherein said step of determining said distance metric comprises the step of terminating a distance calculation if a partial distance in one dimension is already greater than a current closest distance.

17. The method of claim 1, wherein said step of determining said distance metric is performed on each of a plurality of bins forming said histogram, said distance metric for each bin being used as the distance metric for each color sample associated with said bin.

18. The method of claim 1, further comprising the step of generating a compressed movie comprising said color quantizer, said tile table, a plurality of tile codes from said plurality of indexed tile images, and a plurality of skip codes generated from said tile mask.

19. The method of claim 1, wherein a dynamic tile table is generated, said method further comprising the step of scheduling updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

20. The method of claim 19, wherein updates of said tile table are scheduled to appear as late as possible within an available remaining bandwidth.

21. The method of claim 1, further comprising the step of decimating said color histogram.

22. The method of claim 1, wherein said step of determining said set of color centroids comprises the step of selecting an initial set of color centroids from a plurality of most populous colors in said color histogram.

23. The method of claim 2, wherein said step of maintaining a temporal cache further comprises the step of storing, in said temporal cache, color pixel values and respective quantized color pixel values associated with a background image.

24. The method of claim 2, further comprising the step of generating a compressed movie comprising said color quantizer, said tile table, a plurality of tile codes from said plurality of indexed tile images, and a plurality of skip codes generated from said tile mask.

25. The method of claim 2, wherein a dynamic tile table is generated, said method further comprising the step of scheduling updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

26. The method of claim 25, wherein updates of said tile table are scheduled to appear as late as possible within an available remaining bandwidth.

27. The method of claim 2, further comprising the step of decimating said color histogram.

28. The method of claim 3, further comprising the step of generating a compressed movie comprising said color quantizer, said tile table, a plurality of tile codes from said plurality of indexed tile images, and a plurality of skip codes generated from said tile mask.

29. The method of claim 3, wherein a dynamic tile table is generated, said method further comprising the step of scheduling updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

30. The method of claim 29, wherein updates of said tile table are scheduled to appear as late as possible within an available remaining bandwidth.

31. The method of claim 3, further comprising the step of decimating said color histogram.

32. The method of claim 4, wherein said step of determining whether each of said subsequent centroids is closer to said current color pixel than said closest distance comprises the step of:

in a multidimensional color space, calculating a one-dimensional distance between said current color pixel and one of said subsequent centroids;

if said one-dimensional distance is less than said current closest distance, determining a multidimensional distance between said current color pixel value and said one of said subsequent centroids for comparison with said closest distance; and proceeding on to another subsequent centroid if said one-dimensional distance is greater than said closest distance.

33. The method of claim 4, further comprising the step of generating a compressed movie comprising said color quantizer, said tile table, a plurality of tile codes from said plurality of indexed tile images, and a plurality of skip codes generated from said tile mask.

34. The method of claim 4, wherein a dynamic tile table is generated, said method further comprising the step of scheduling updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

35. The method of claim 34, wherein updates of said tile table are scheduled to appear as late as possible within an available remaining bandwidth.

36. The method of claim 4, further comprising the step of decimating said color histogram.

37. The method of claim 5, further comprising the step of generating a compressed movie comprising said color quantizer, said tile table, a plurality of tile codes from said plurality of indexed tile images, and a plurality of skip codes generated from said tile mask.

38. The method of claim 5, wherein a dynamic tile table is generated, said method further comprising the step of scheduling updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

39. The method of claim 38, wherein updates of said tile table are scheduled to appear as late as possible within an available remaining bandwidth.

40. The method of claim 5, wherein said step of determining whether said current tile is an exact match comprises the step of checking for a matching tile in a temporal tile cache.

41. The method of claim 5, wherein said step of determining whether said current tile is an exact match comprises the step of checking for a matching tile in a spatial tile cache.

42. The method of claim 5, wherein said step of determining whether said current tile is an exact match comprises the step of checking for a matching tile in said tile table.

43. The method of claim 5, wherein said step of determining said distance between said current tile and a nearest tile in said tile table comprises the step of calculating a distance between a first tile and a second tile by summing distances between respective color pixel values via a table containing precalculated distances between a plurality of pairs of possible color pixel values.

44. The method of claim 5, wherein said step of determining a distance between said current tile and a nearest tile in said tile table comprises the steps of:

determining said nearest tile to said current tile from a plurality of possible tiles; and terminating a distance calculation if a partial distance is already greater than a current closest distance.

45. The computer program product of claim 6, wherein said immediate neighborhood comprises a set of centroids containing a closest neighboring centroid in each axis-aligned octant.

46. The computer program product of claim 6, wherein said computer readable program code configured to cause a computer to adjust said current centroids comprises:

computer readable program code configured to cause a computer to add said accumulation of deviations to generate a weighted average of all assigned samples for each current centroid; and computer readable program code configured to cause a computer to add noise to each of said current centroids on a decreasing schedule.

47. The computer program product of claim 6, wherein said computer readable program code configured to cause a computer to determine said distance metric comprises:

computer readable program code configured to cause a computer to terminate a distance calculation if a partial distance in one dimension is already greater than a current closest distance.

48. The computer program product of claim 6, wherein said determination of said distance metric is performed on each of a plurality of bins forming said histogram, said distance metric for each bin being used as the distance metric for each color sample associated with said bin.

49. The computer program product of claim 6, further comprising:

computer readable program code configured to cause a computer to generate a compressed movie comprising said color quantizer, said tile table, a plurality of tile codes from said plurality of indexed tile images, and a plurality of skip codes generated from said tile mask.

50. The computer program product of claim 6, further comprising:

computer readable program code configured to cause a computer to schedule updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

51. The computer program product of claim 50, wherein updates of said tile table are scheduled to appear as late as possible within an available remaining bandwidth.

52. The computer program product of claim 6, further comprising:

computer readable program code configured to cause a computer to decimate said color histogram.

53. The computer program product of claim 6, wherein said computer readable program code configured to cause a computer to determine said set of color centroids comprises:

computer readable program code configured to cause a computer to select an initial set of color centroids from a plurality of most populous colors in said color histogram.

54. The computer program product of claim 7, wherein said computer readable program code configured to cause a computer to maintain a temporal cache further comprises:

computer readable program code configured to cause a computer to store, in said temporal cache, color pixel values and respective quantized color pixel values associated with a background image.

55. The computer program product of claim 7, further comprising:

computer readable program code configured to cause a computer to generate a compressed movie comprising said color quantizer, said tile table, a plurality of tile codes from said plurality of indexed tile images, and a plurality of skip codes generated from said tile mask.

56. The computer program product of claim 7, further comprising:

computer readable program code configured to cause a computer to schedule updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

57. The computer program product of claim 56, wherein updates of said tile table are scheduled to appear as late as possible within an available remaining bandwidth.

58. The computer program product of claim 7, further comprising:

computer readable program code configured to cause a computer to decimate said color histogram.

59. The computer program product of claim 8, further comprising:

computer readable program code configured to cause a computer to generate a compressed movie comprising said color quantizer, said tile table, a plurality of tile codes from said plurality of indexed tile images, and a plurality of skip codes generated from said tile mask.

60. The computer program product of claim 8, further comprising:

computer readable program code configured to cause a computer to schedule updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

61. The computer program product of claim 60, wherein updates of said tile table are scheduled to appear as late as possible within an available remaining bandwidth.

62. The computer program product of claim 8, further comprising:

computer readable program code configured to cause a computer to decimate said color histogram.

63. The computer program product of claim 9, wherein said computer readable program code configured to cause a computer to determine whether each of said subsequent centroids is closer to said current color pixel than said closest distance comprises:
 computer readable program code configured to cause a computer to calculate a one-dimensional distance between said current color pixel and one of said subsequent centroids in a multidimensional color space;
 computer readable program code configured to cause a computer to determine a multidimensional distance between said current color pixel value and said one of said subsequent centroids for comparison with said closest distance if said one-dimensional distance is less than said current closest distance; and
 computer readable program code configured to cause a computer to proceed on to another subsequent centroid if said one-dimensional distance is greater than said closest distance.

64. The computer program product of claim 9, further comprising:
 computer readable program code configured to cause a computer to generate a compressed movie comprising said color quantizer, said tile table, a plurality of tile codes from said plurality of indexed tile images, and a plurality of skip codes generated from said tile mask.

65. The computer program product of claim 9, further comprising:
 computer readable program code configured to cause a computer to schedule updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

66. The computer program product of claim 65, wherein updates of said tile table are scheduled to appear as late as possible within an available remaining bandwidth.

67. The computer program product of claim 9, further comprising:
 computer readable program code configured to cause a computer to decimate said color histogram.

68. The computer program product of claim 10, wherein said computer readable program code configured to cause a computer to determine whether said current tile is an exact match comprises:
 computer readable program code configured to cause a computer to check for a matching tile in a temporal tile cache.

69. The computer program product of claim 68, wherein said computer readable program code configured to cause a computer to determine whether said current tile is an exact match comprises:
 computer readable program code configured to cause a computer to check for a matching tile in a spatial tile cache.

70. The computer program product of claim 10, wherein said computer readable program code configured to cause a computer to determine whether said current tile is an exact match comprises:
 computer readable program code configured to cause a computer to check for a matching tile in said tile table.

71. The computer program product of claim 10, further comprising:
 computer readable program code configured to cause a computer to generate a compressed movie comprising said color quantizer, said tile table, a plurality of tile codes from said plurality of indexed tile images, and a plurality of skip codes generated from said tile mask.

72. The computer program product of claim 10, further comprising:
 computer readable program code configured to cause a computer to schedule updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

73. The computer program product of claim 72, wherein updates of said tile table are scheduled to appear as late as possible within an available remaining bandwidth.

74. The computer program product of claim 10, wherein said computer readable program code configured to cause a computer to determine a distance between said current tile and a nearest tile in said tile table comprises:
 computer readable program code configured to cause a computer to determine said nearest tile to said current tile from a plurality of possible tiles; and
 computer readable program code configured to cause a computer to terminate a distance calculation if a partial distance is already greater than a current closest distance.

75. The method of claim 11, wherein the step of determining said distance between each color pixel in said respective tile and each corresponding color pixel in said previously displayed tile comprises the step of obtaining said distance from a table containing precalculated distances between possible pairs of color pixel values.

76. The method of claim 11, wherein said step of determining said tile change salience further comprises the steps of:
 comparing each color pixel in said respective tile to each corresponding color pixel in said previously displayed tile;
 if each color pixel in said respective tile matches each corresponding color pixel in said previously displayed tile:
 setting said tile change salience to zero; and
 moving to a next tile.

77. The method of claim 11, further comprising the step of generating a compressed movie comprising said color quantizer, said tile table, a plurality of tile codes from said plurality of indexed tile images, and a plurality of skip codes generated from said tile mask.

78. The method of claim 11, wherein a dynamic tile table is generated, said method further comprising the step of scheduling updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

79. The method of claim 78, wherein updates of said tile table are scheduled to appear as late as possible within an available remaining bandwidth.

80. The method of claim 11, wherein said step of forming said tile mask comprises the steps of:
 determining a plurality of tiles having the largest tile change saliences using an indexed quicksort;
 designating in said tile mask that said plurality of tiles having the largest tile change saliences are to be displayed.

81. The computer program product of claim 12, wherein the computer readable program code configured to cause a computer to determine said distance between each color pixel in said respective tile and each corresponding color pixel in said previously displayed tile comprises:

computer readable program code configured to cause a computer to obtain said distance from a table containing precalculated distances between possible pairs of color pixel values.

82. The computer program product of claim 12, wherein said computer readable program code configured to cause a computer to determine said tile change salience further comprises:

computer readable program code configured to cause a computer to compare each color pixel in said respective tile to each corresponding color pixel in said previously displayed tile;

computer readable program code configured to cause a computer to set said tile change salience to zero and move to a next tile if each color pixel in said respective tile matches each corresponding color pixel in said previously displayed tile.

83. The computer program product of claim 12, further comprising:

computer readable program code configured to cause a computer to generate a compressed movie comprising said color quantizer, said tile table, a plurality of tile codes from said plurality of indexed tile images, and a plurality of skip codes generated from said tile mask.

84. The computer program product of claim 12, further comprising:

computer readable program code configured to cause a computer to schedule updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

85. The computer program product of claim 84, wherein updates of said tile table are scheduled to appear as late as possible within an available remaining bandwidth.

86. The computer program product of claim 12, wherein said computer readable program code configured to cause a computer to form said tile mask comprises:

computer readable program code configured to cause a computer to determine a plurality of tiles having the largest tile change saliences using an indexed quicksort;

computer readable program code configured to cause a computer to designate in said tile mask that said plurality of tiles having the largest tile change saliences are to be displayed.

87. The computer program product of claim 13, wherein said computer readable program code configured to cause a computer to determine whether said current tile is an exact match comprises:

computer readable program code configured to cause a computer to check for a matching tile in a temporal tile cache.

88. The computer program product of claim 87, wherein said computer readable program code configured to cause a computer to determine whether said current tile is an exact match comprises:

computer readable program code configured to cause a computer to check for a matching tile in a spatial tile cache.

89. The computer program product of claim 13, wherein said computer readable program code configured to cause a computer to determine whether said current tile is an exact match comprises:

computer readable program code configured to cause a computer to check for a matching tile in said tile table.

90. The computer program product of claim 13, further comprising:

computer readable program code configured to cause a computer to generate a compressed movie comprising said color quantizer, said tile table, a plurality of tile codes from said plurality of indexed tile images, and a plurality of skip codes generated from said tile mask.

91. The computer program product of claim 13, further comprising:

computer readable program code configured to cause a computer to schedule updates of said tile table by examining a compressed image sequence backward from the end to determine when updates of said tile table are needed, and placing update tiles in said compressed image sequence, wherein said update tiles are available in advance of when said update tiles are needed without exceeding a target data rate.

92. The computer program product of claim 91, wherein updates of said tile table are scheduled to appear as late as possible within an available remaining bandwidth.

93. The computer program product of claim 13, wherein said computer readable program code configured to cause a computer to determine a distance between said current tile and a nearest tile in said tile table comprises:

computer readable program code configured to cause a computer to determine said nearest tile to said current tile from a plurality of possible tiles; and computer readable program code configured to cause a computer to terminate a distance calculation if a partial distance is already greater than a current closest distance.

* * * * *